United States Patent
Yi et al.

(10) Patent No.: US 11,063,703 B2
(45) Date of Patent: Jul. 13, 2021

(54) METHOD AND APPARATUS FOR SUPPORTING MIXED NUMEROLOGIES FOR URLLC USAGE SCENARIOS IN WIRELESS COMMUNICATION SYSTEM

(71) Applicant: LG Electronics Inc., Seoul (KR)

(72) Inventors: Yunjung Yi, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 16/305,293

(22) PCT Filed: Jun. 16, 2017

(86) PCT No.: PCT/KR2017/006309
§ 371 (c)(1),
(2) Date: Nov. 28, 2018

(87) PCT Pub. No.: WO2017/209585
PCT Pub. Date: Dec. 7, 2017

(65) Prior Publication Data
US 2020/0336249 A1    Oct. 22, 2020

Related U.S. Application Data

(60) Provisional application No. 62/356,517, filed on Jun. 29, 2016, provisional application No. 62/354,116, (Continued)

(51) Int. Cl.
*H04W 4/00* (2018.01)
*H04L 1/16* (2006.01)
(Continued)

(52) U.S. Cl.
CPC .......... *H04L 1/1642* (2013.01); *H04L 5/0082* (2013.01); *H04L 5/0094* (2013.01);
(Continued)

(58) Field of Classification Search
None
See application file for complete search history.

(56) References Cited

U.S. PATENT DOCUMENTS

2015/0180622 A1    6/2015 Yoo et al.
2016/0352551 A1*  12/2016 Zhang ................. H04L 27/2646
(Continued)

OTHER PUBLICATIONS

Huawei, "Discussion on frame structure for NR," 3GPP TSG RAN WG1 Meeting #85, dated May 23-27, 2016, 10 pages.
(Continued)

*Primary Examiner* — Clemence S Han
(74) *Attorney, Agent, or Firm* — Fish & Richardson P.C.

(57) ABSTRACT

A method and apparatus for using multiple numerologies in a wireless communication system is provided. A user equipment (UE), specifically UE supporting ultra-reliable low-latency communication (URLLC), uses a first numerology in a first numerology resource unit group (NRG) with a reference subcarrier spacing, switches from the first numerology to a second numerology, and uses the second numerology in a second NRG with a specific subcarrier spacing different from the reference subcarrier spacing. The first NRG is a set of frequency and time resources based on the first numerology, and the second NRG is a set of frequency and time resources based on the second numerology.

18 Claims, 23 Drawing Sheets

Related U.S. Application Data filed on Jun. 24, 2016, provisional application No. 62/343,007, filed on May 29, 2016.

(51) Int. Cl.

| | |
|---|---|
| *H04L 5/00* | (2006.01) |
| *H04W 56/00* | (2009.01) |
| *H04W 72/04* | (2009.01) |
| *H04W 72/12* | (2009.01) |
| *H04W 72/14* | (2009.01) |

(52) U.S. Cl.
CPC ....... *H04W 56/001* (2013.01); *H04W 72/042* (2013.01); *H04W 72/0446* (2013.01); *H04W 72/0453* (2013.01); *H04W 72/1263* (2013.01); *H04W 72/14* (2013.01)

(56) References Cited

U.S. PATENT DOCUMENTS

| | | | |
|---|---|---|---|
| 2017/0156140 A1* | 6/2017 | Islam | H04L 5/0044 |
| 2020/0296749 A1* | 9/2020 | Freda | H04W 72/0413 |
| 2020/0305129 A1* | 9/2020 | Lee | H04W 72/0446 |

OTHER PUBLICATIONS

Lenovo, "Frame structure design for new radio interface," 3GPP TSG RAN WG1 Meeting #85, dated May 23-27, 2016, 5 pages.

Panasonic, "Discussion on the multiplexing of different numerologies," 3GPP TSG-RAN WG1 Meeting 85, dated May 23-27, 2016, 7 pages.

KT Corp., Verizon Wireless, "Discussion on NR numerology," 3GPP TSG RAN WG1 Meeting #85, dated May 23-27, 2016, 7 pages.

* cited by examiner

[Fig. 1]
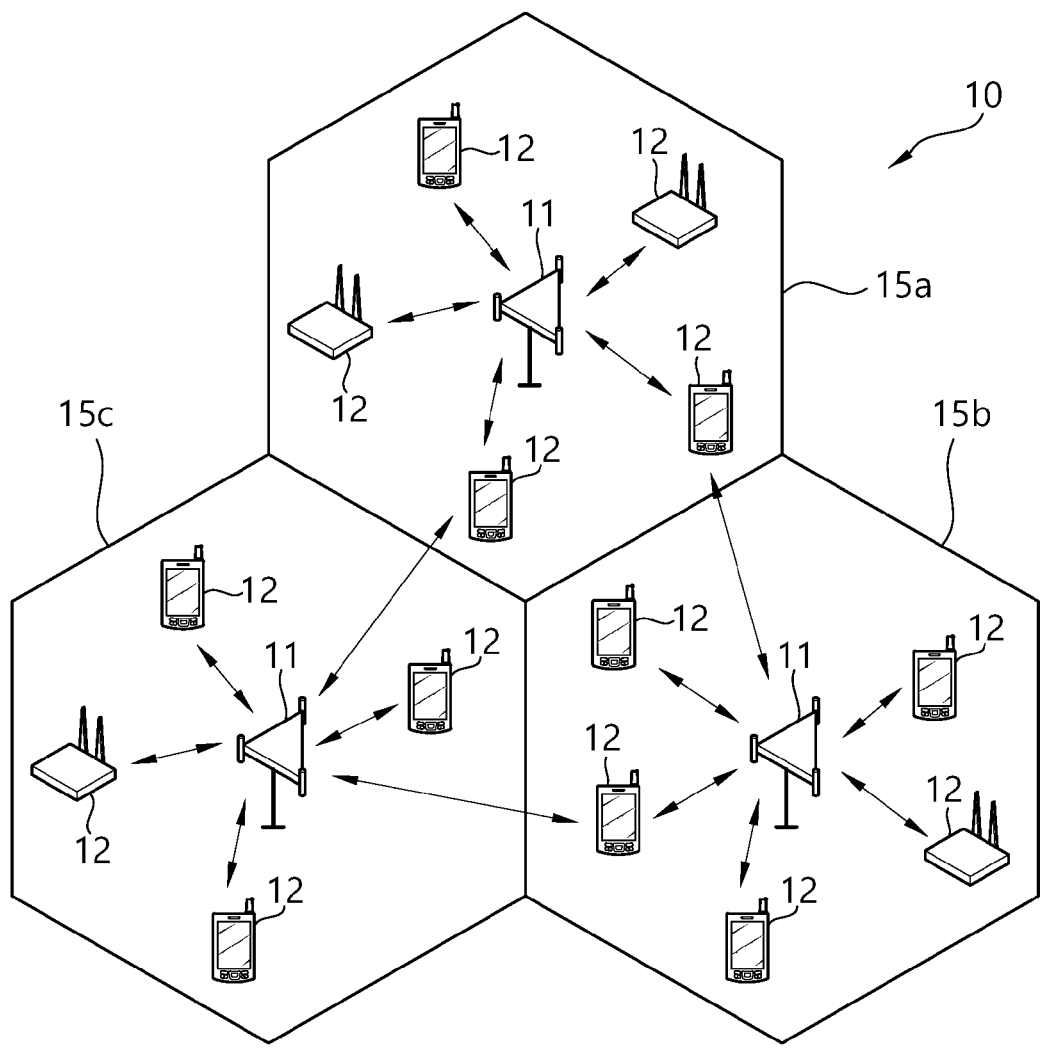
[Fig. 2]
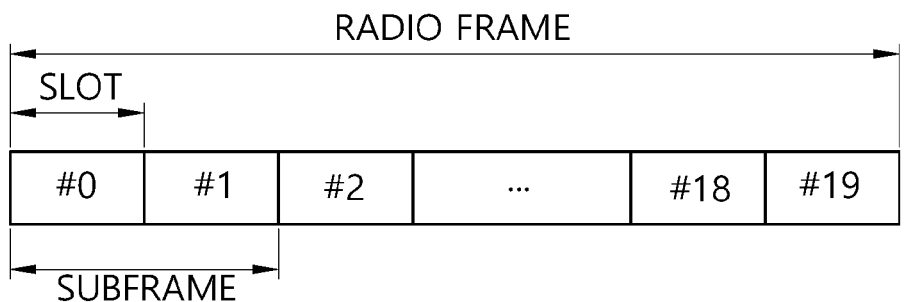

[Fig. 3]
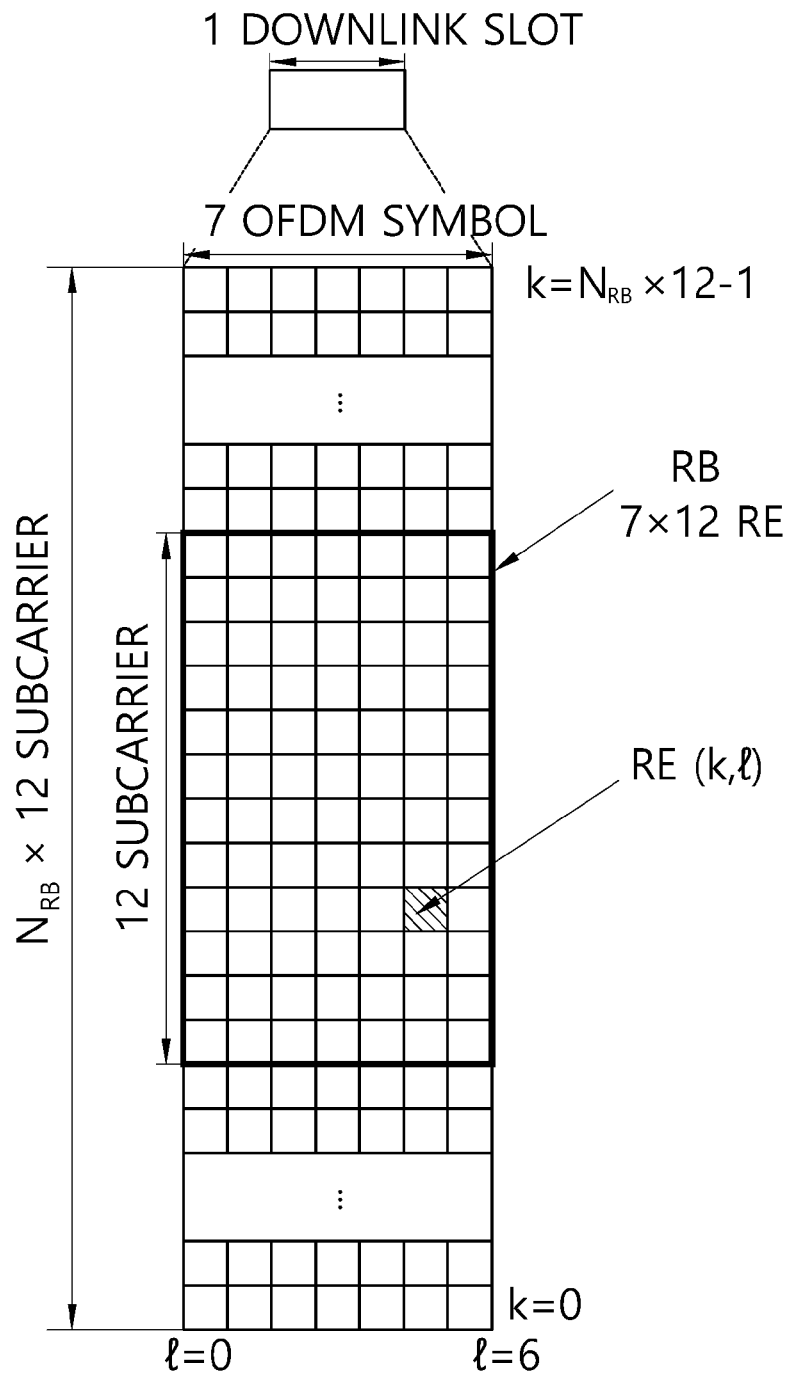

[Fig. 4]
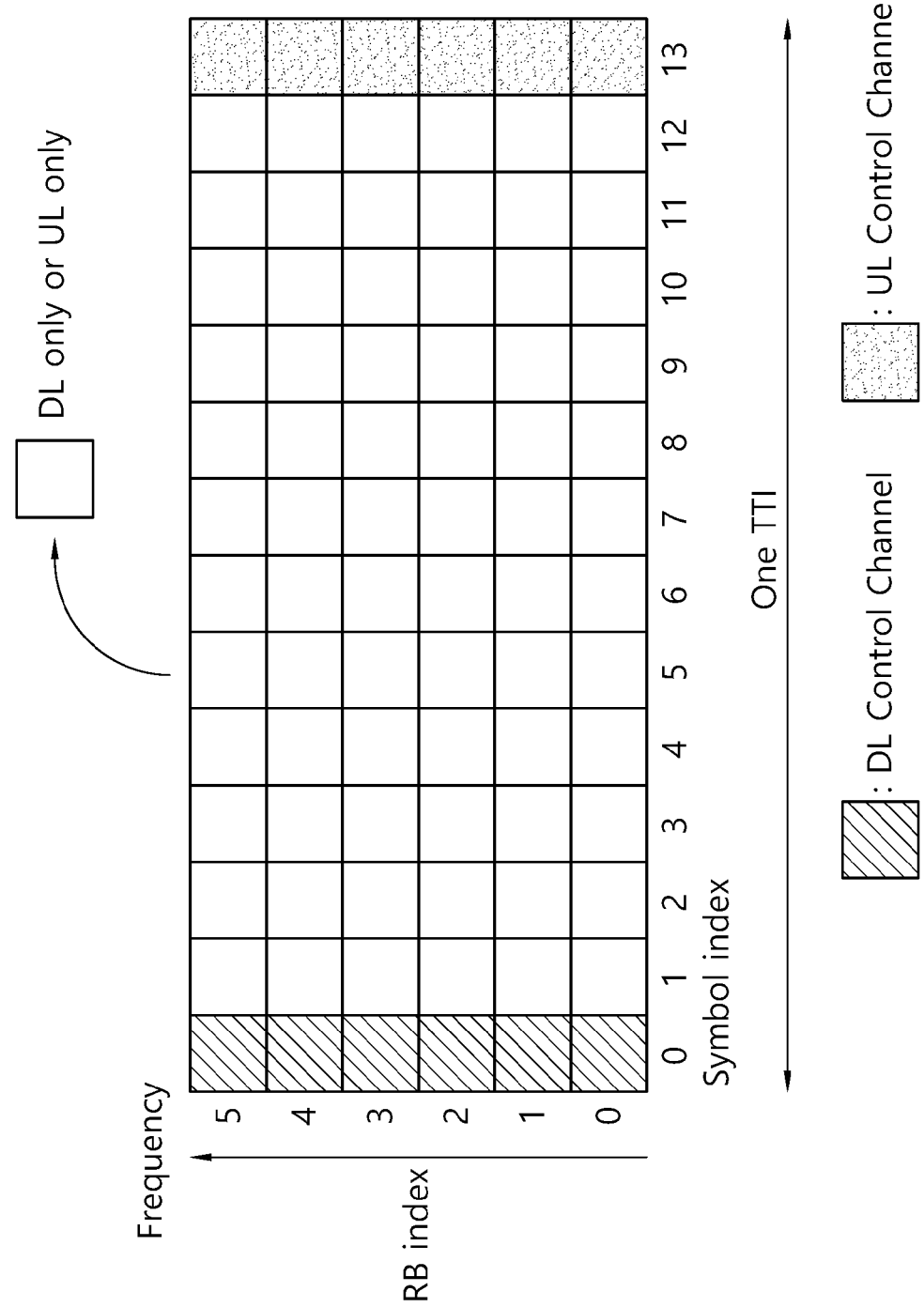

[Fig. 5]
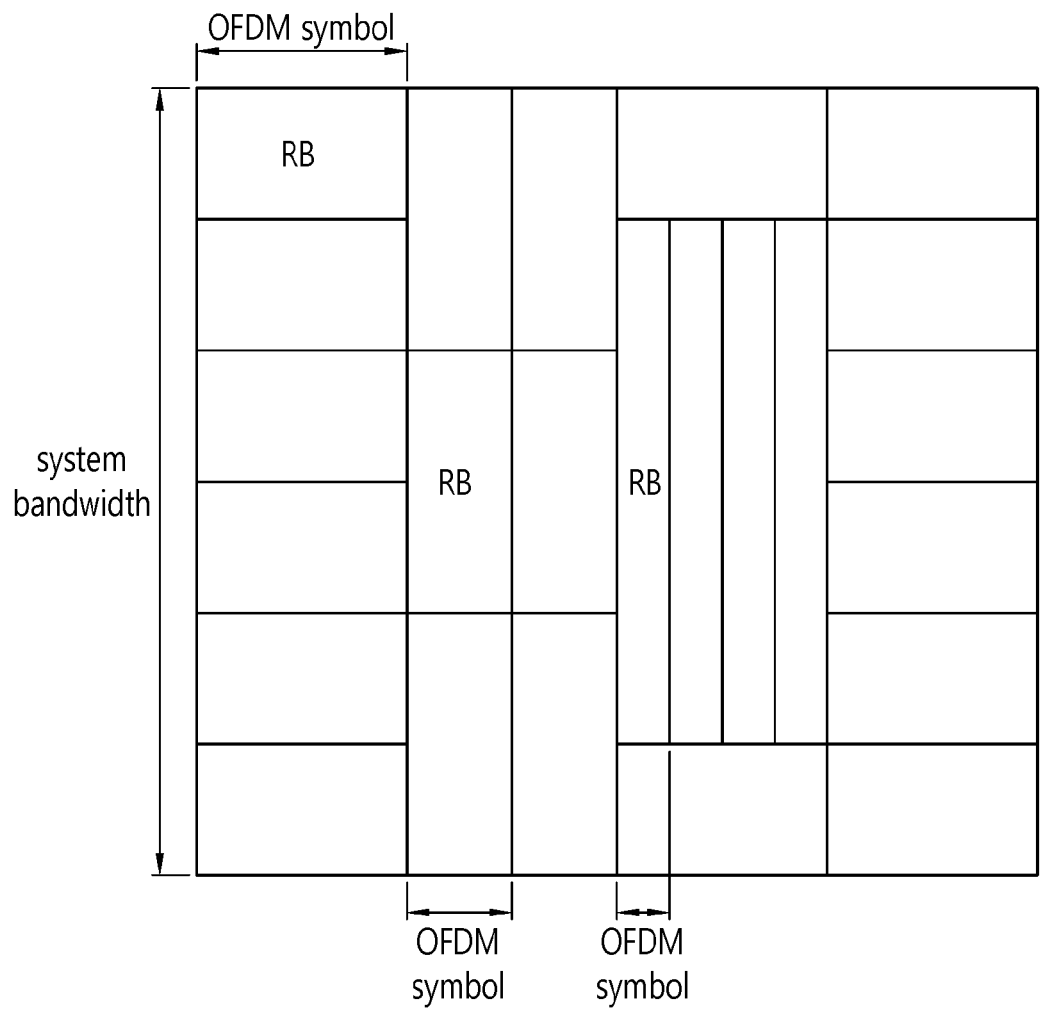

[Fig. 6]
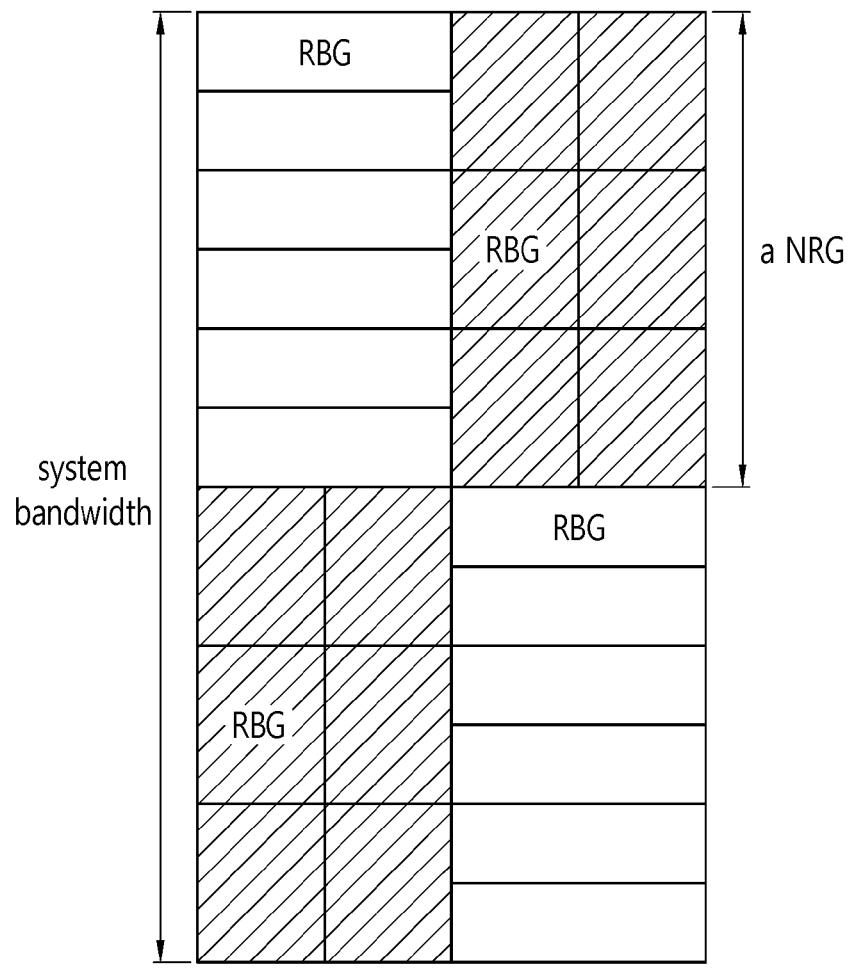

[Fig. 7]
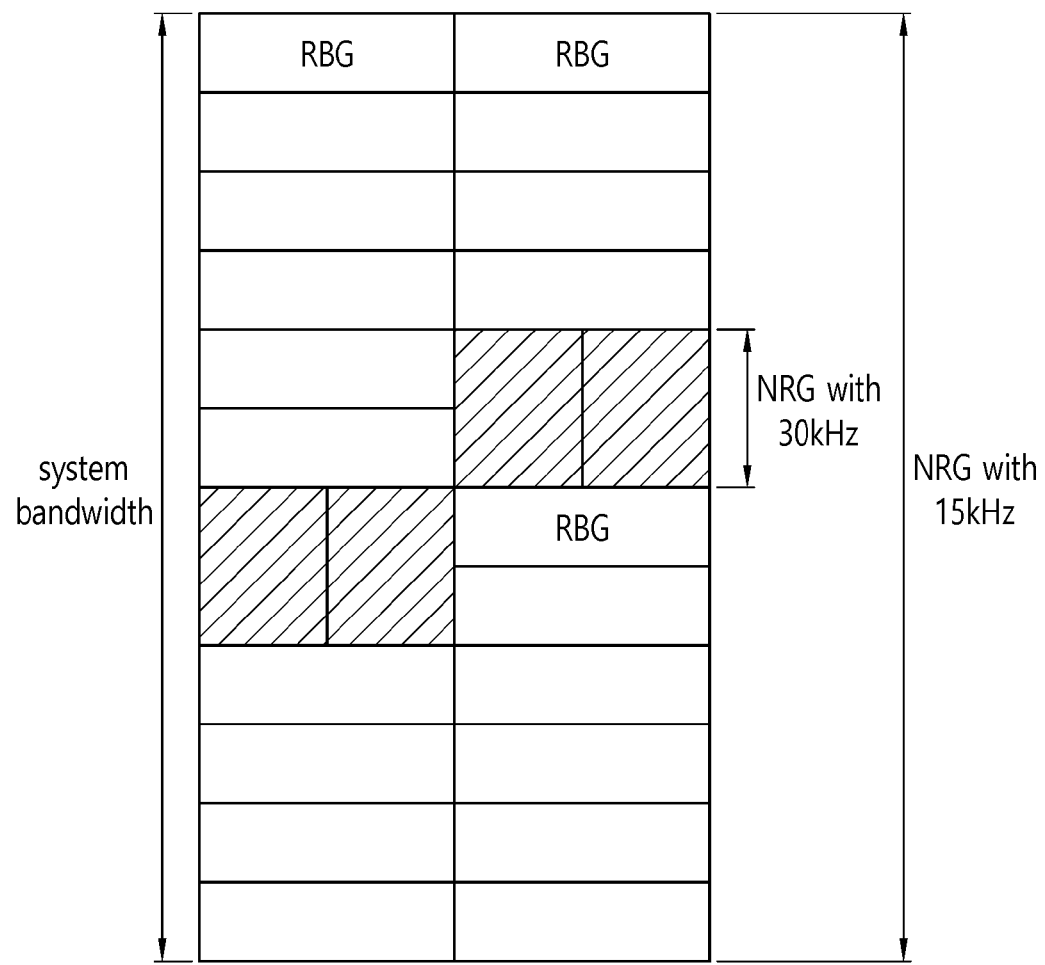

[Fig. 8]
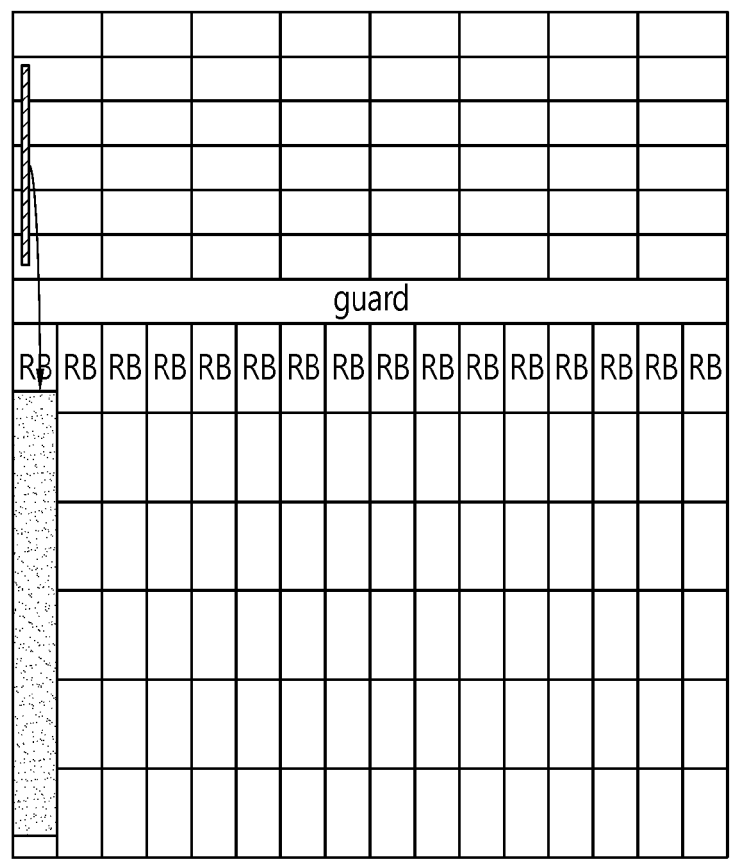

[Fig. 9]
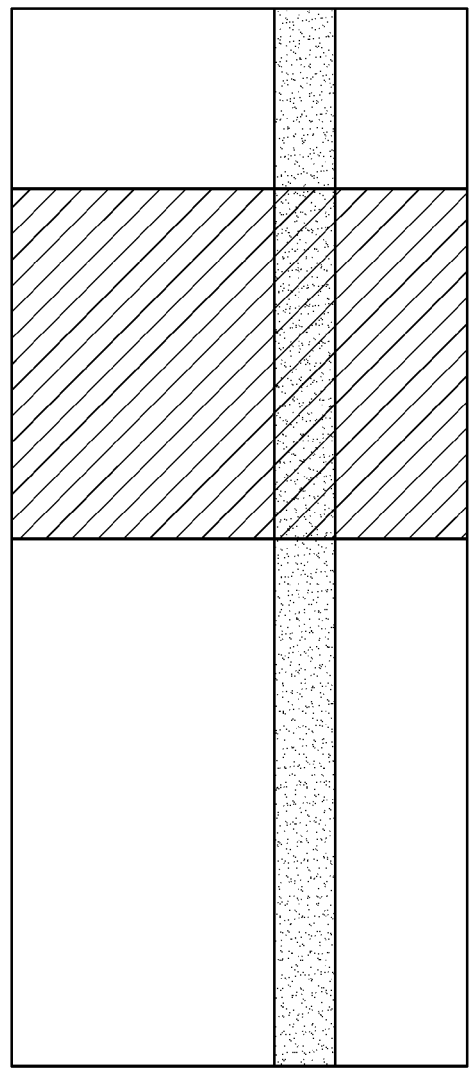
 : eMBB UE maximum system bandwidth
 : URLLC UE maximum system bandwidth

[Fig. 10]
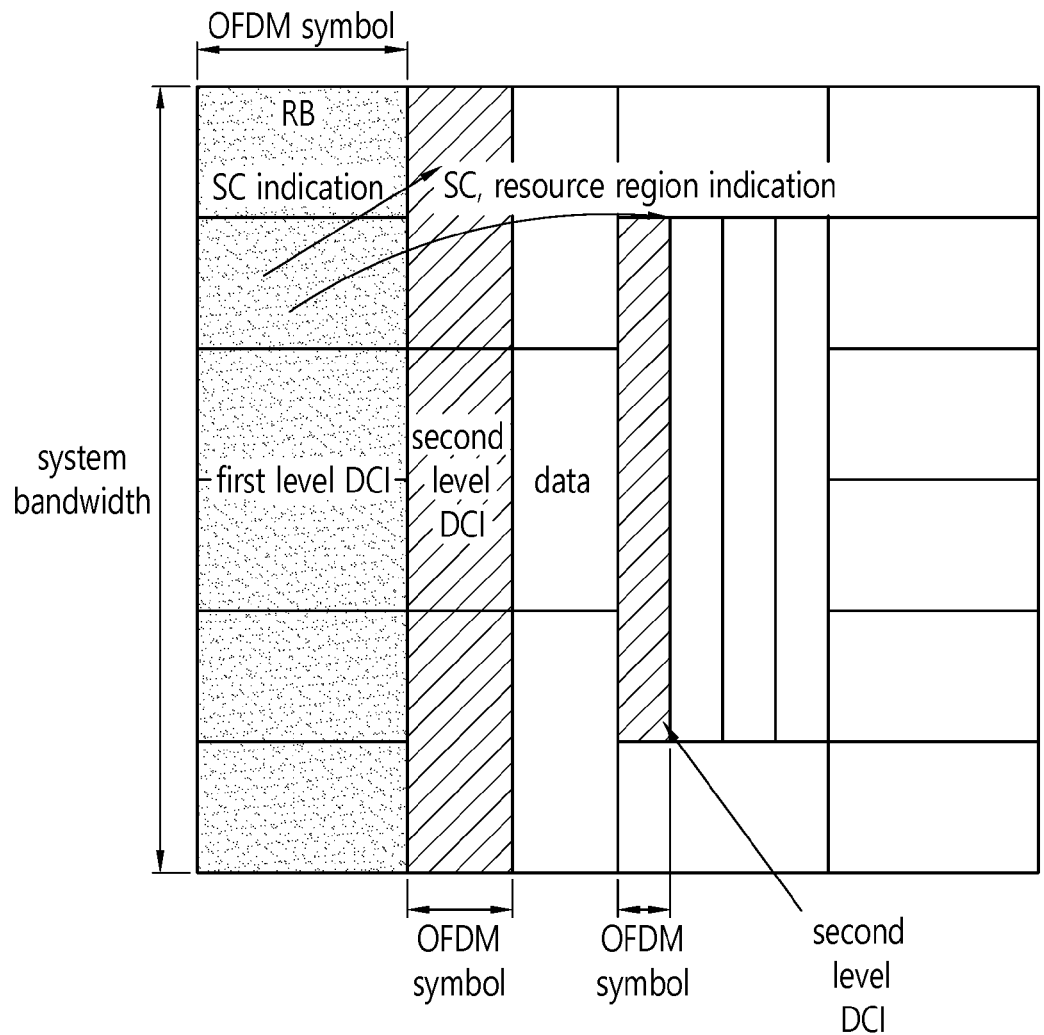

[Fig. 11]
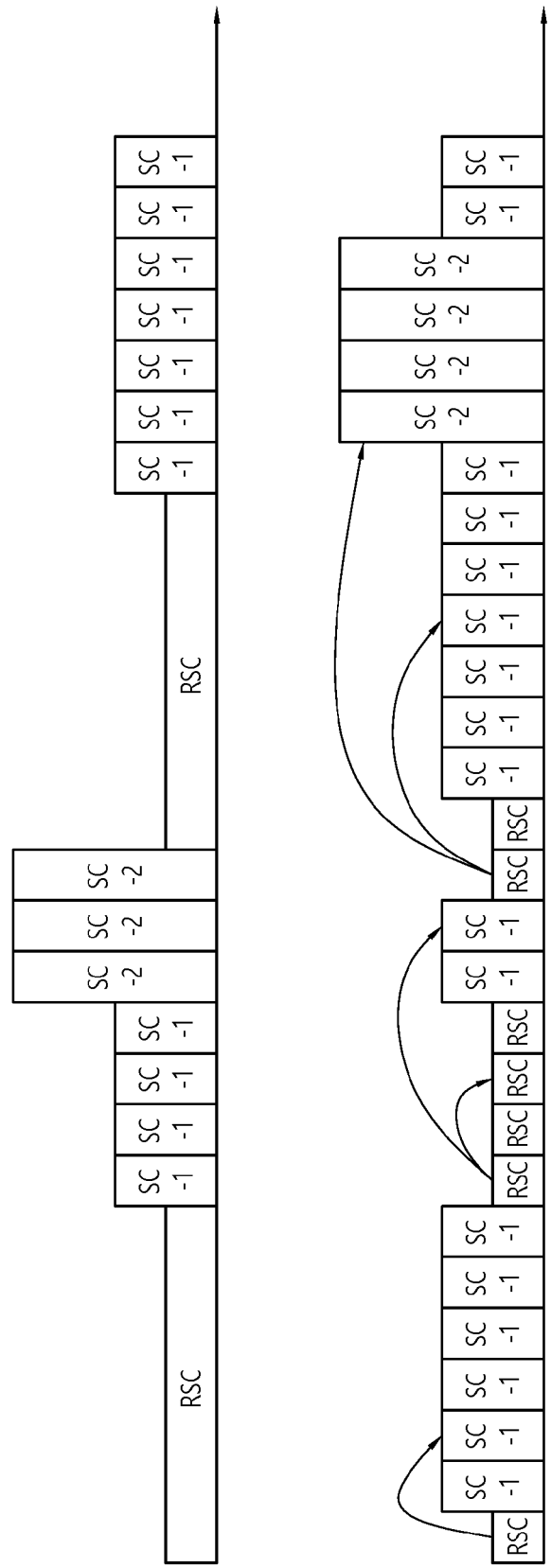

[Fig. 12]
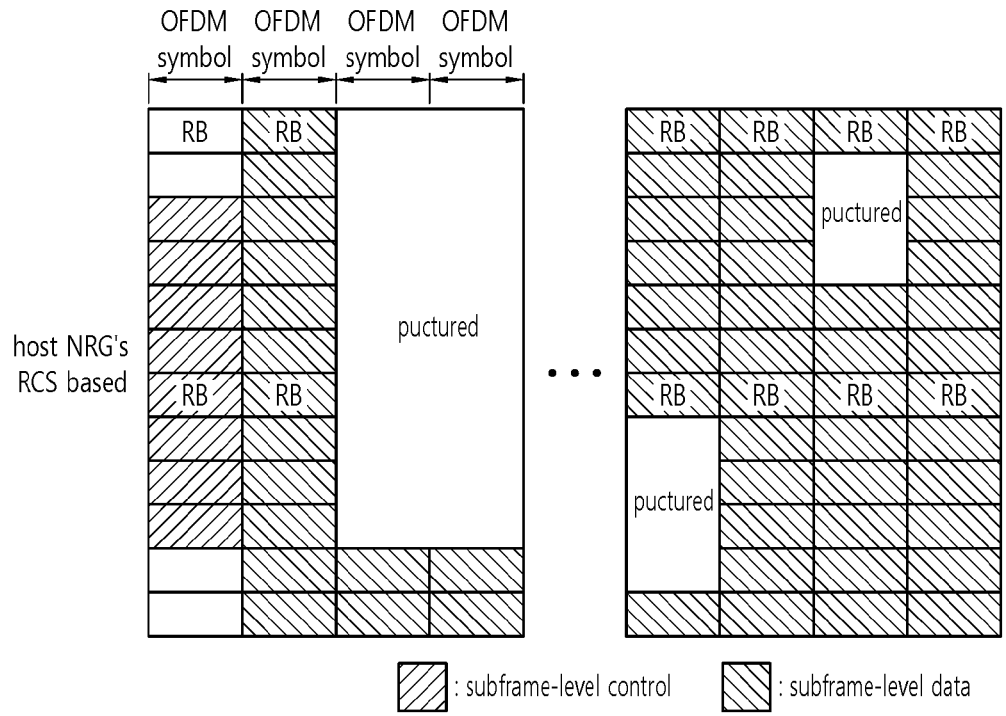
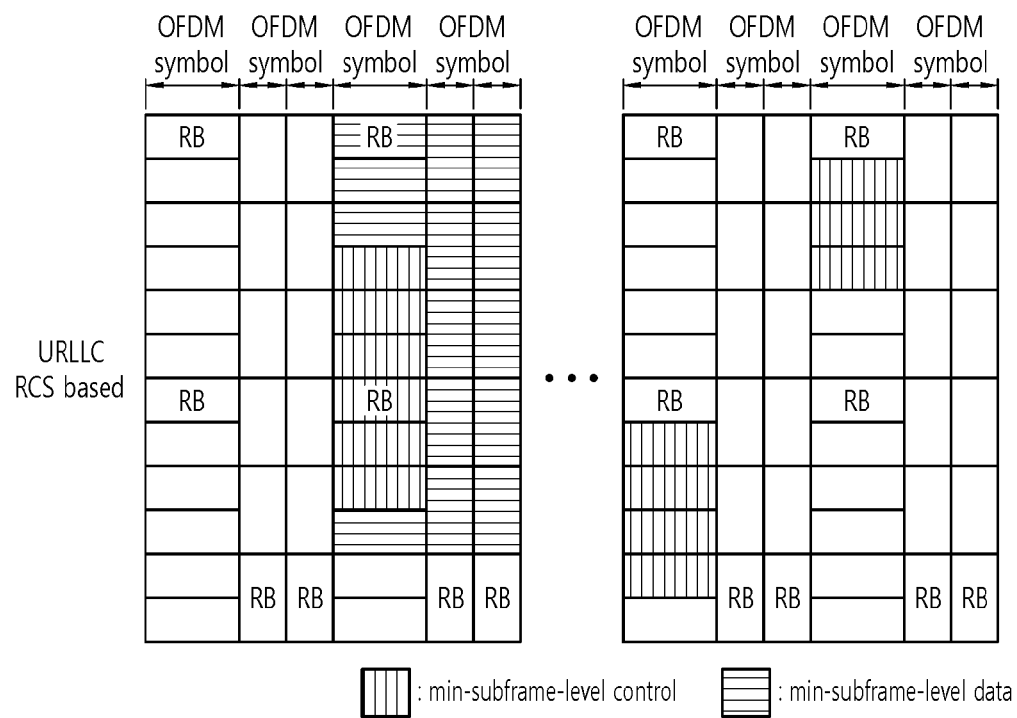

[Fig. 13]
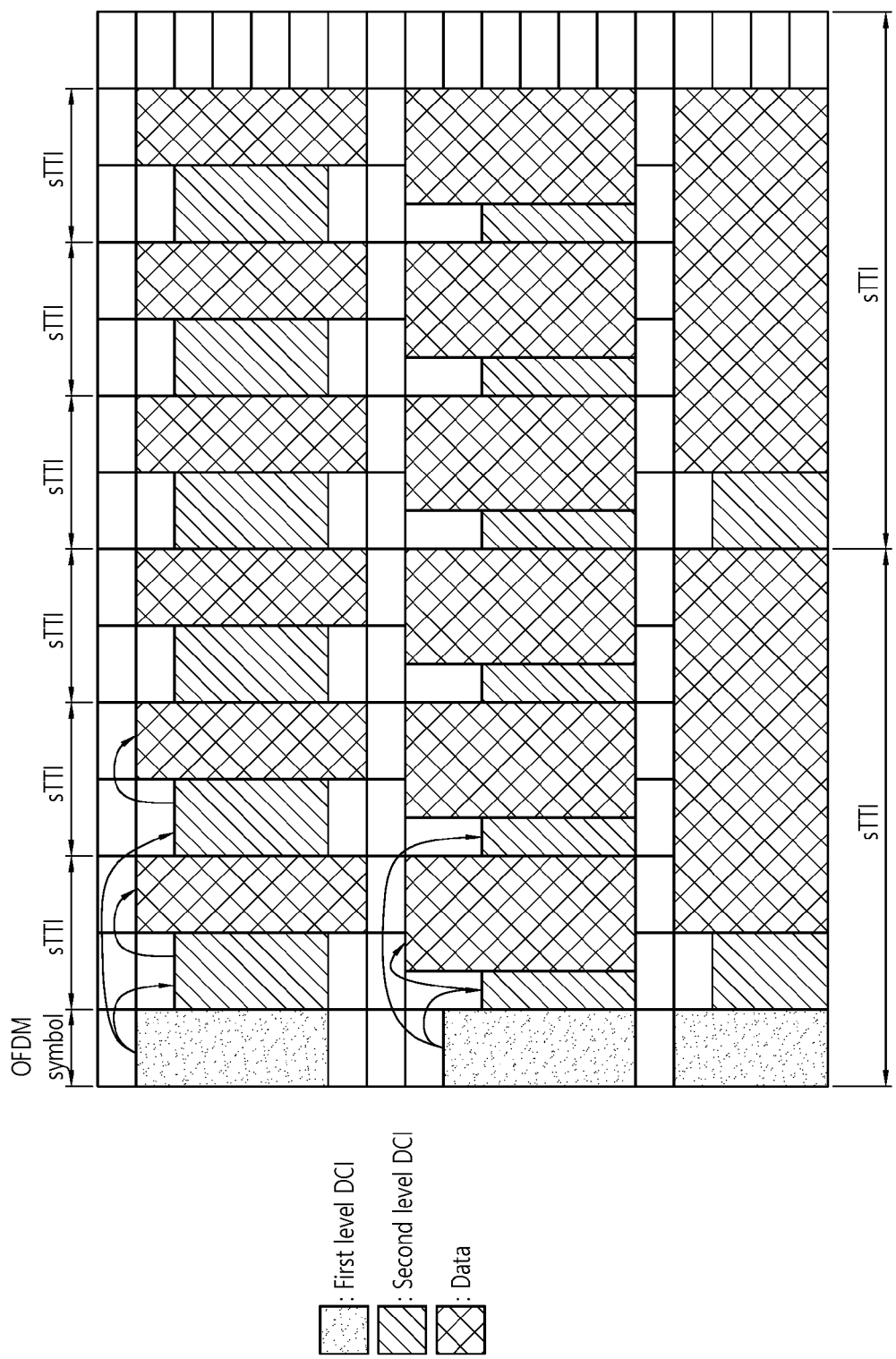

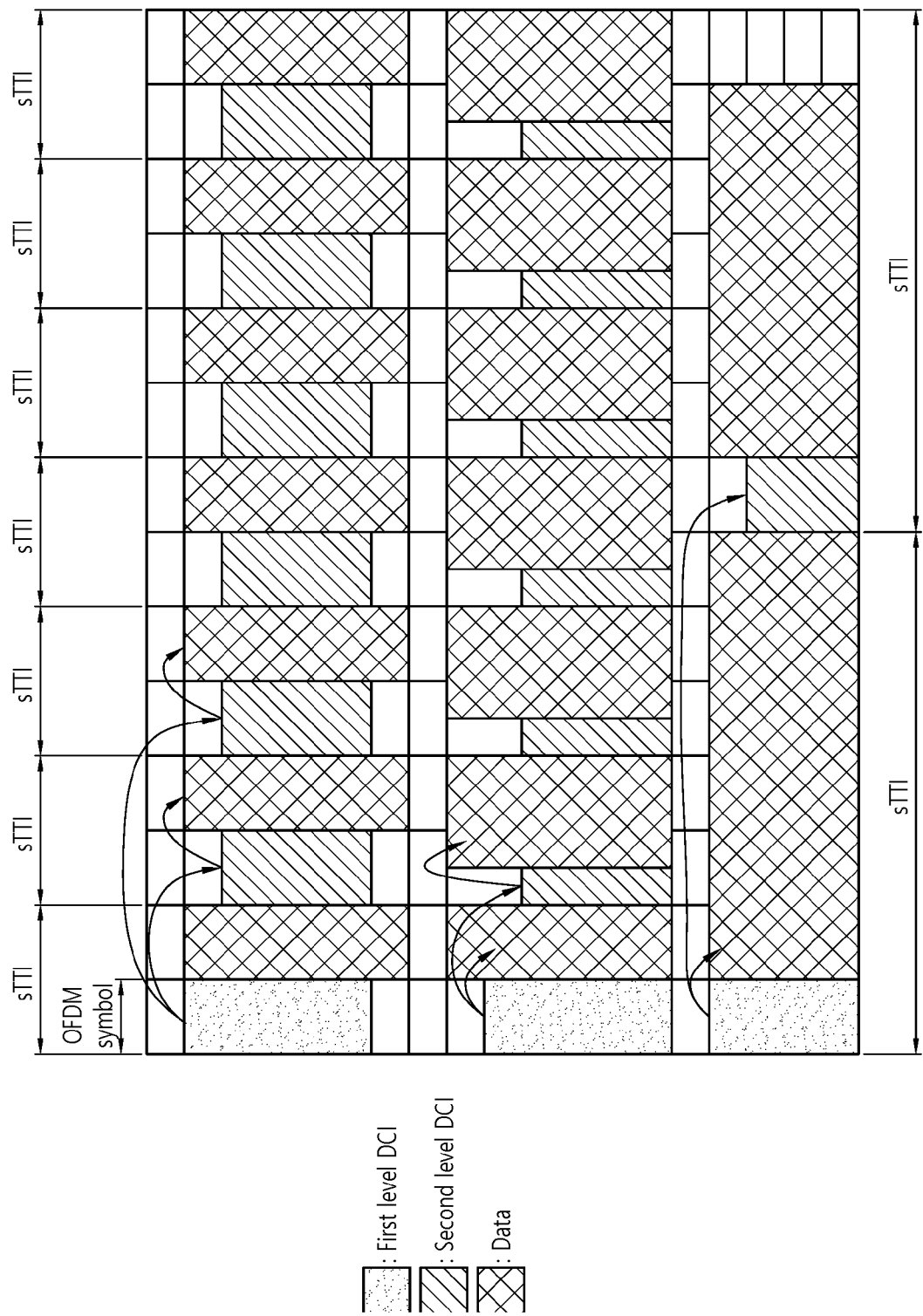
[Fig. 14]

[Fig. 15]
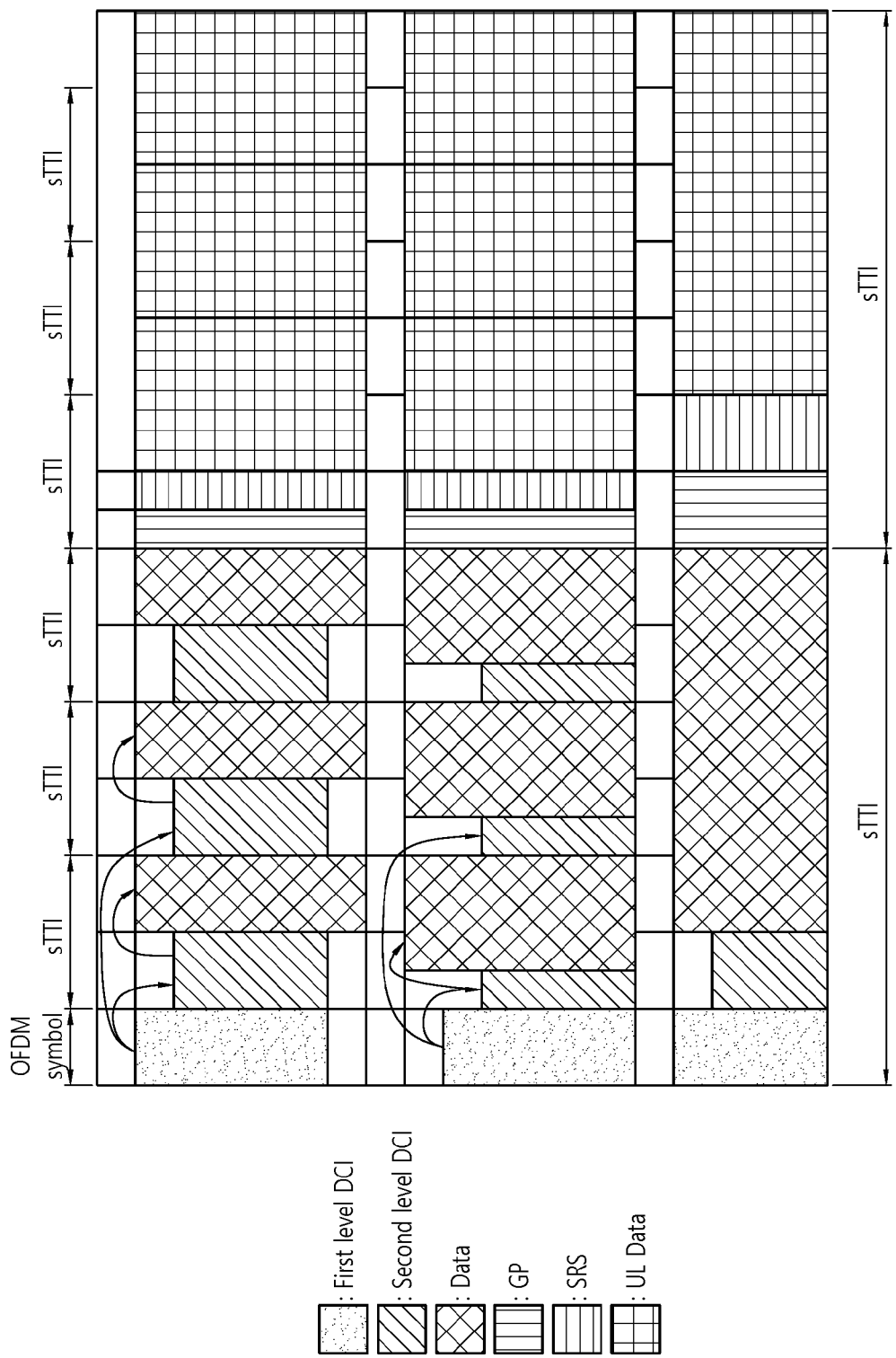

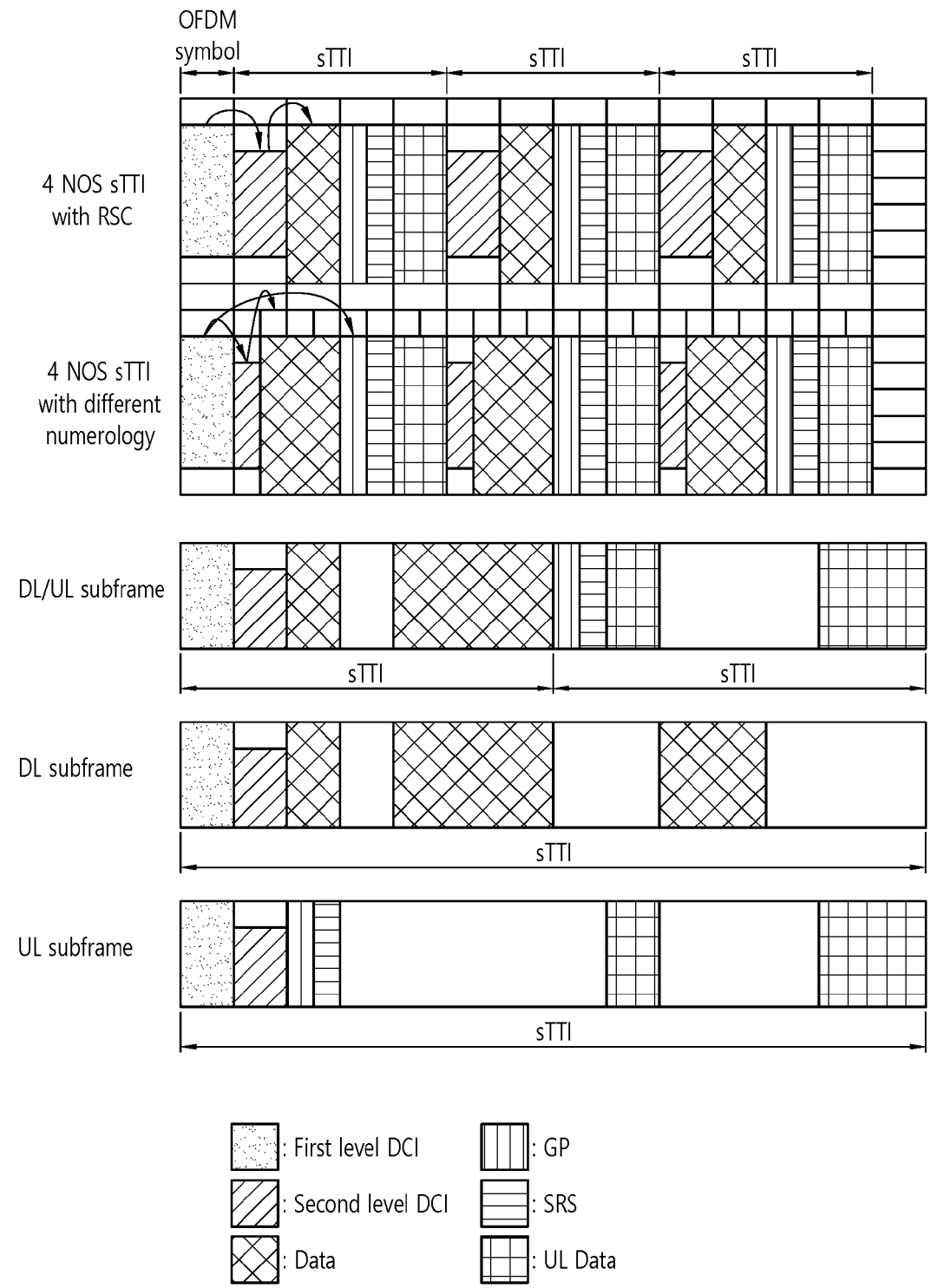
[Fig. 16]

[Fig. 17]
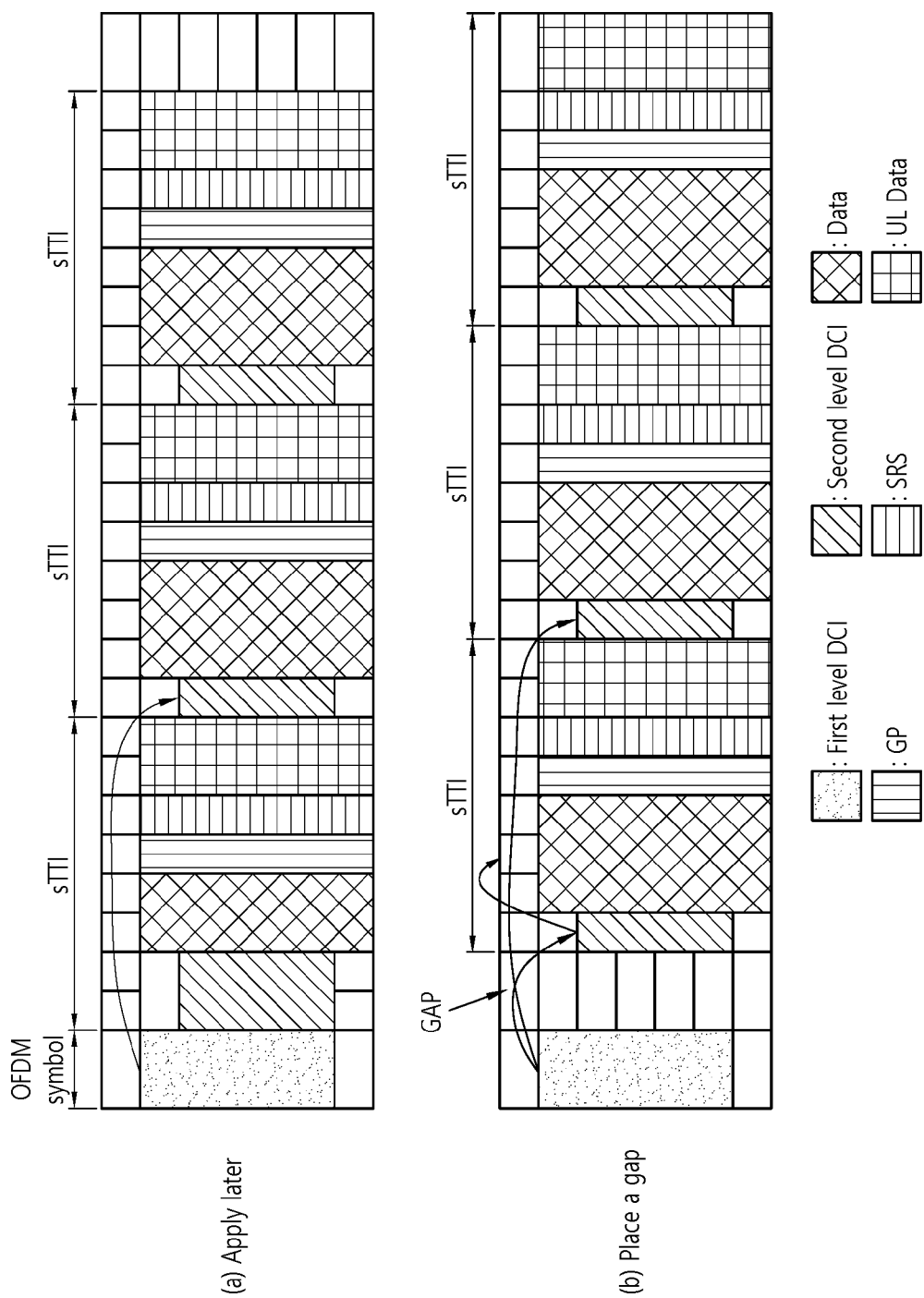

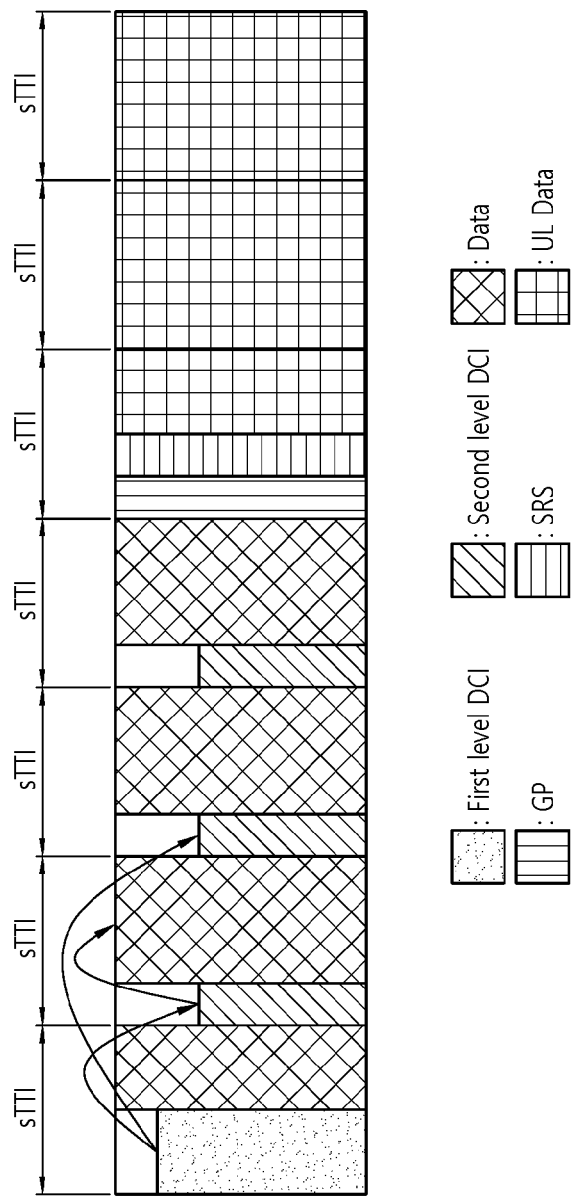
[Fig. 18]

[Fig. 19]
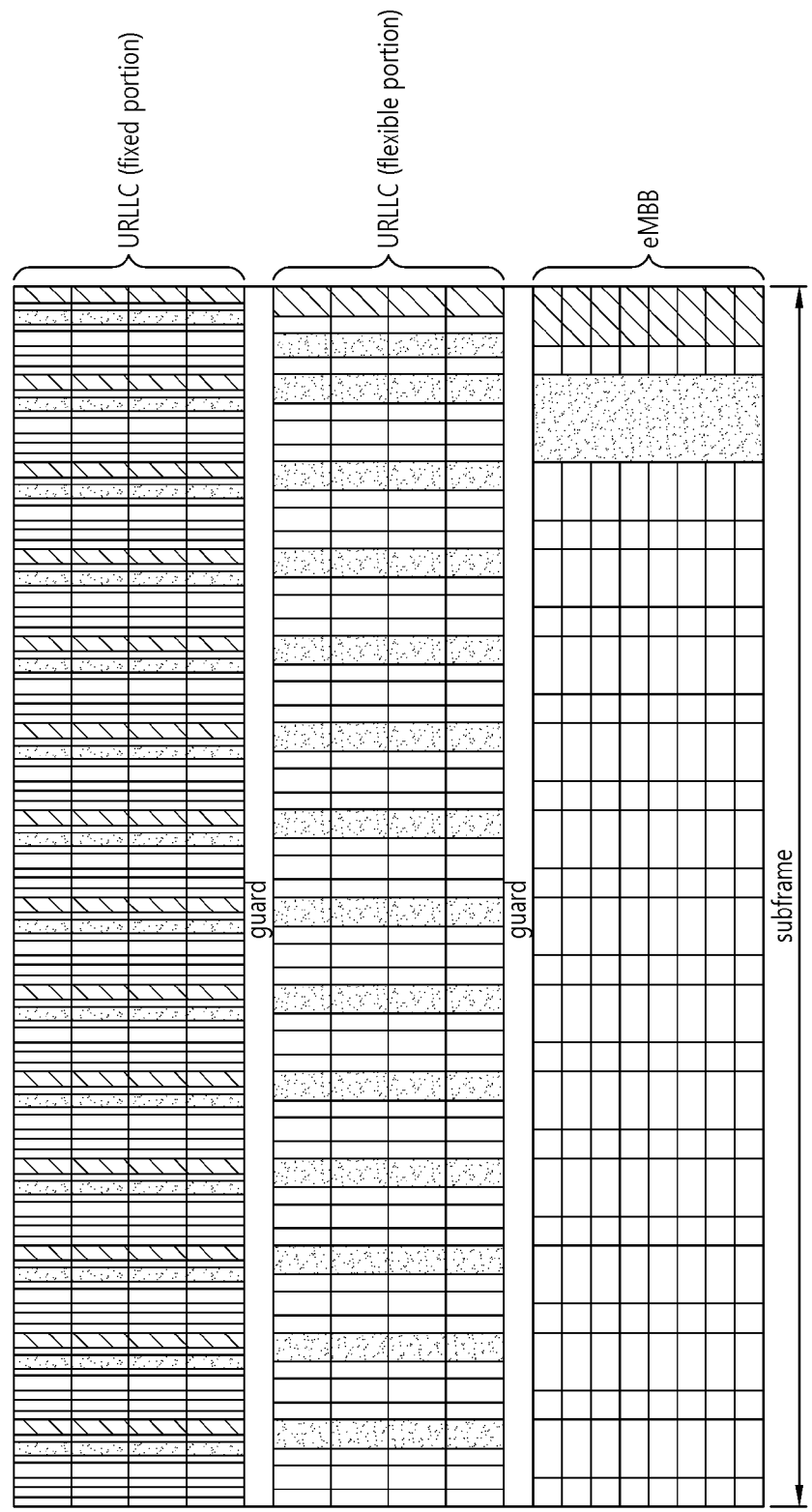

[Fig. 20]
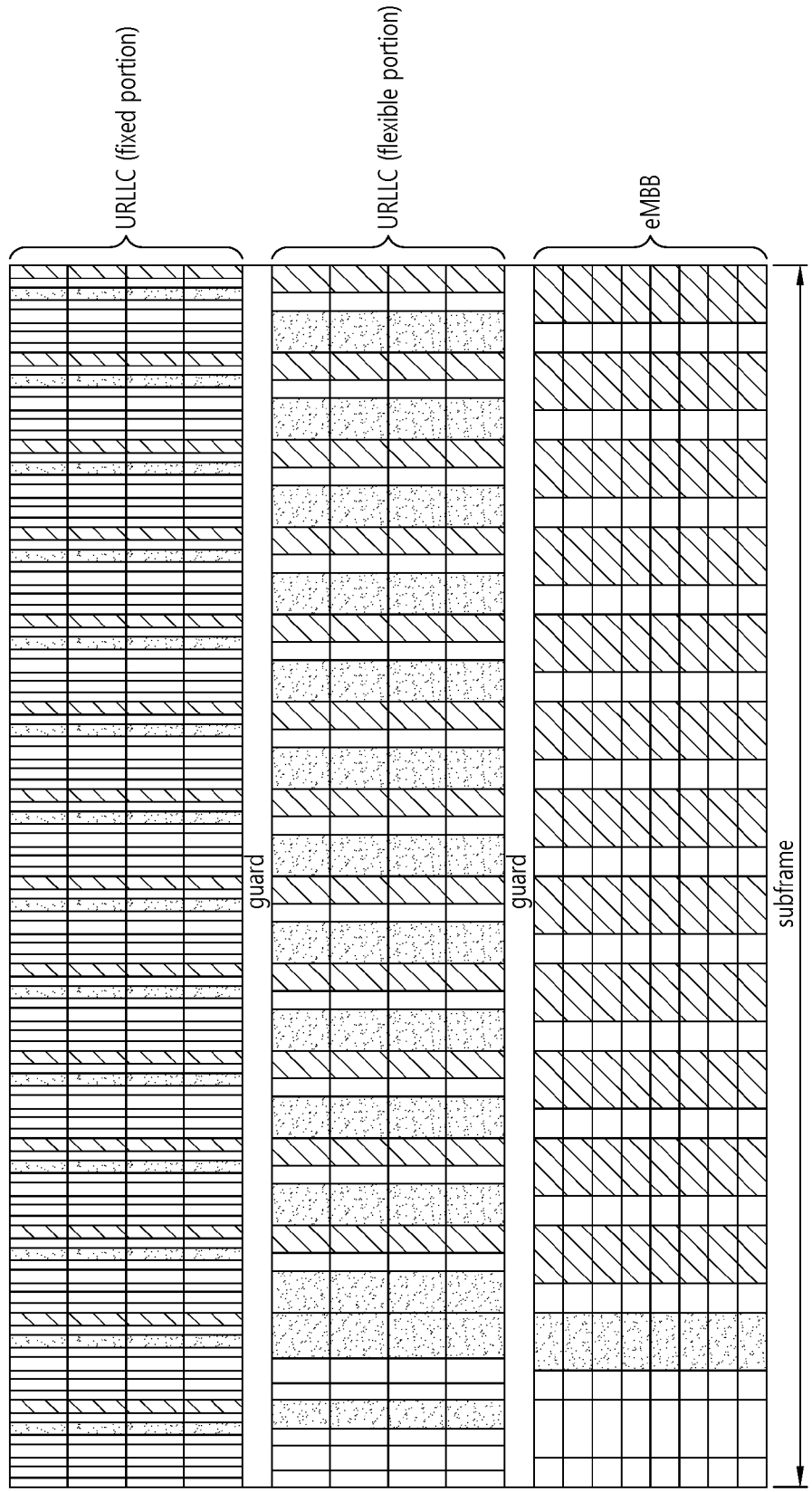

[Fig. 21]
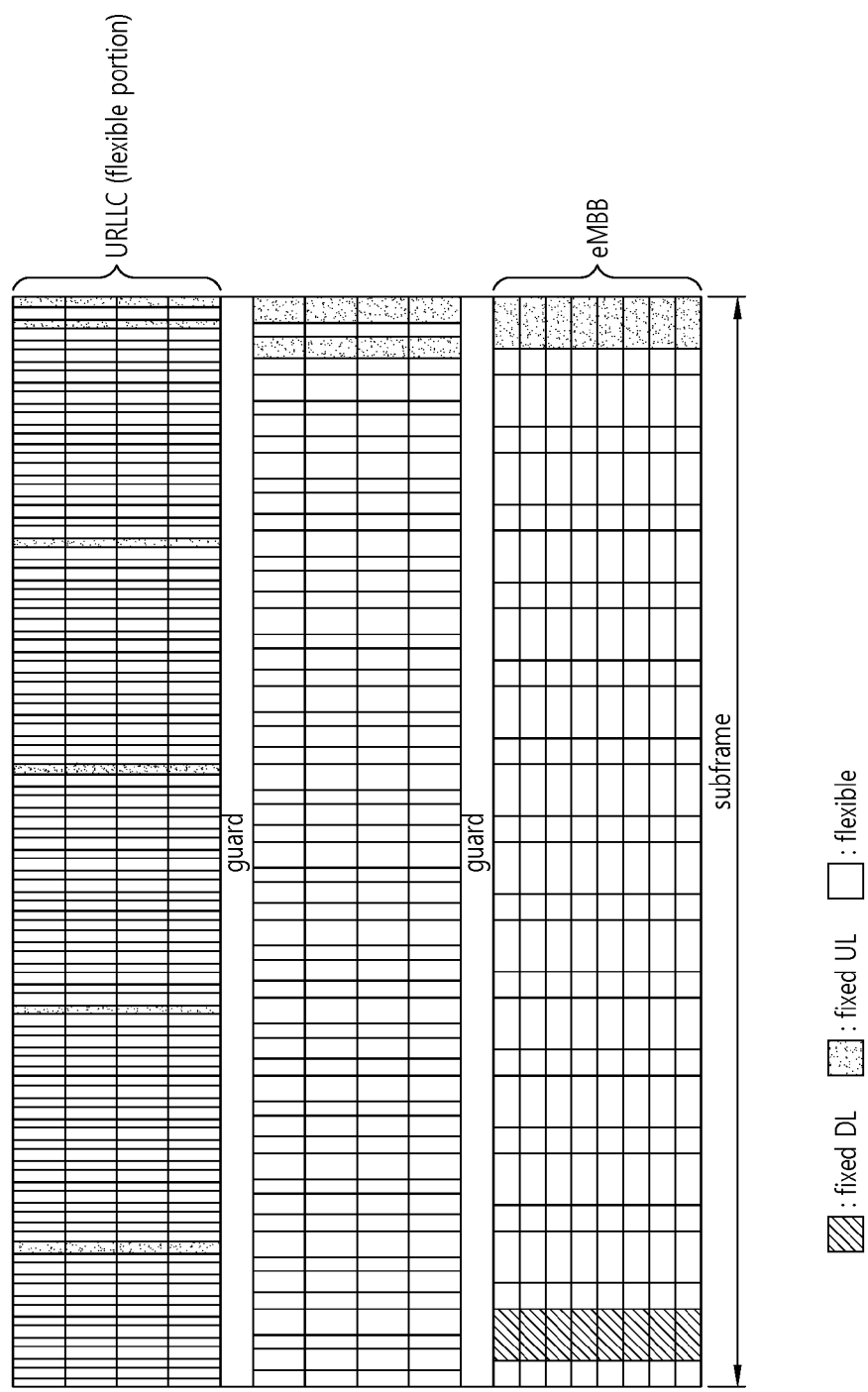

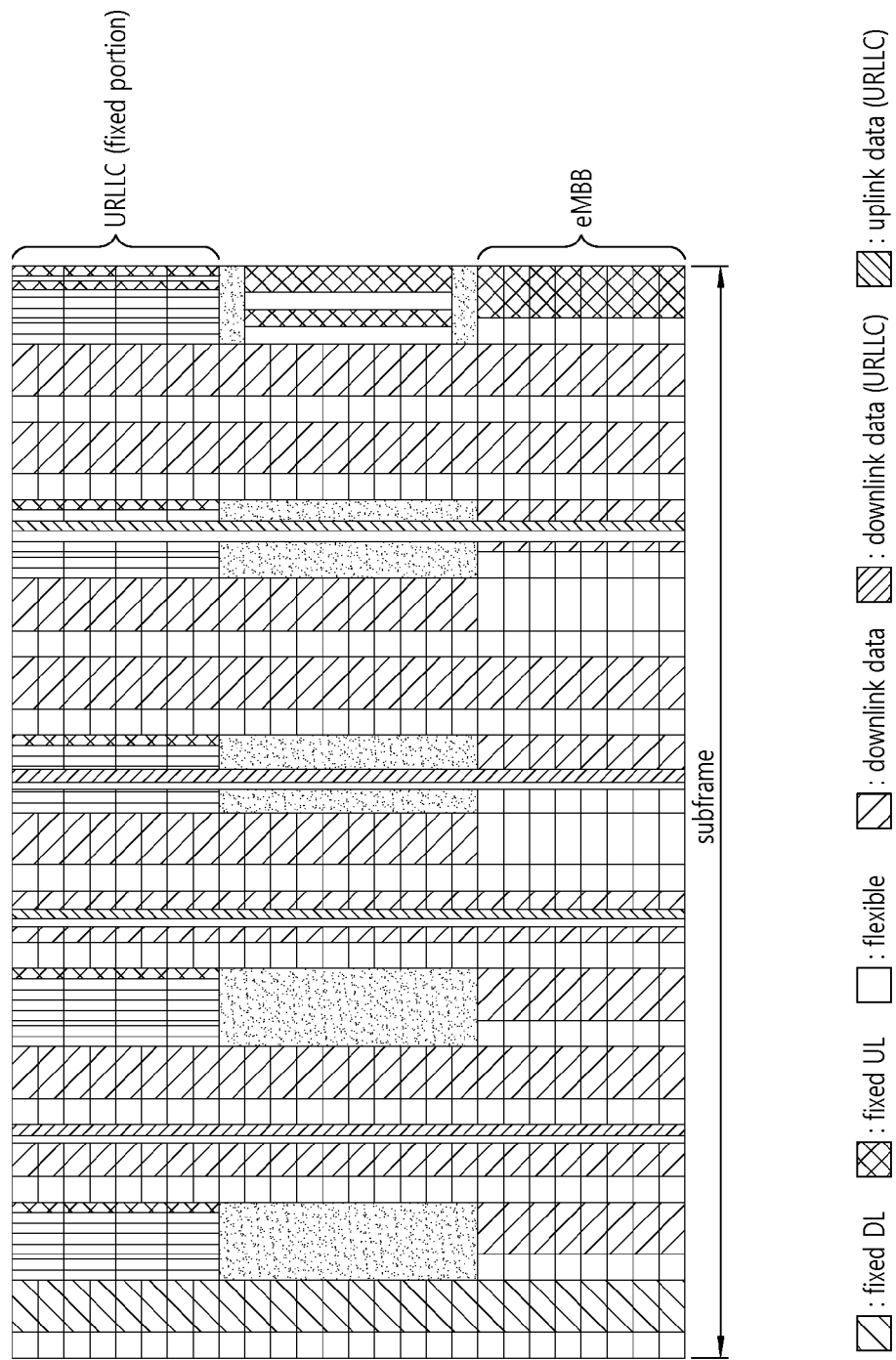
[Fig. 22]

[Fig. 23]
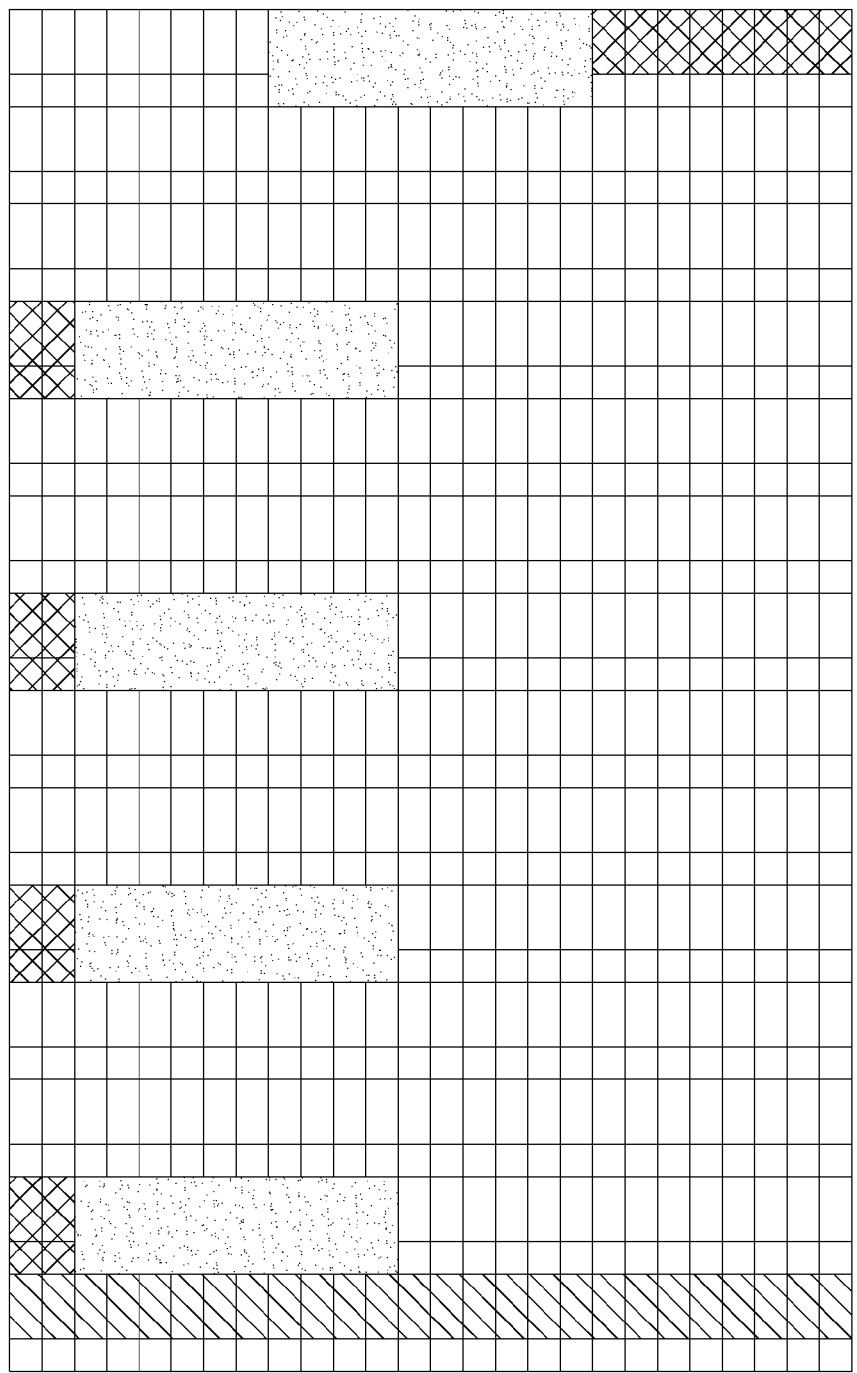

[Fig. 24]
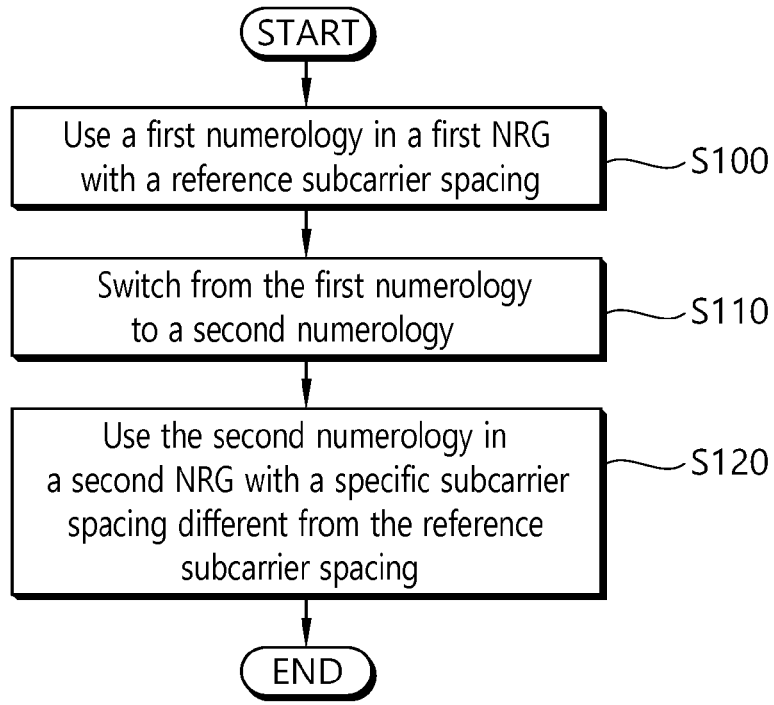
[Fig. 25]
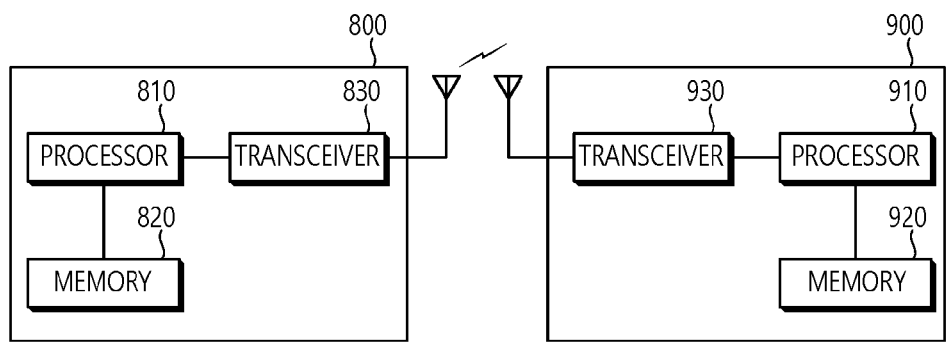

METHOD AND APPARATUS FOR SUPPORTING MIXED NUMEROLOGIES FOR URLLC USAGE SCENARIOS IN WIRELESS COMMUNICATION SYSTEM

CROSS-REFERENCE TO RELATED APPLICATIONS

This application is a National Stage application under 35 U.S.C. § 371 of International Application No. PCT/KR2017/006309, filed on Jun. 16, 2017, which claims the benefit of U.S. Provisional Application No. 62/356,517, filed on Jun. 29, 2016, U.S. Provisional Application No. 62/354,116, filed on Jun. 24, 2016, and U.S. Provisional Application No. 62/343,007, filed on May 29, 2016. The disclosures of the prior applications are incorporated by reference in their entirety.

TECHNICAL FIELD

The present invention relates to wireless communications, and more particularly, to a method and apparatus for supporting mixed numerologies for ultra-reliable low latency communication (URLLC) usage scenarios in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

DISCLOSURE OF INVENTION

Technical Problem

The present invention provides a method and apparatus for supporting mixed numerologies for ultra-reliable low latency communication (URLLC) usage scenarios in a wireless communication system. The present invention discusses different numerology options supported in new radio access technology (NR) to meet various usage scenarios.

Solution to Problem

In an aspect, a method for using multiple numerologies by a user equipment (UE) in a wireless communication system is provided. The method includes using a first numerology in a first numerology resource unit group (NRG) with a reference subcarrier spacing, switching from the first numerology to a second numerology, and using the second numerology in a second NRG with a specific subcarrier spacing different from the reference subcarrier spacing. The first NRG is a set of frequency and time resources based on the first numerology, and the second NRG is a set of frequency and time resources based on the second numerology.

In another aspect, a user equipment (UE) in a wireless communication system is provided. The UE includes a memory, a transceiver, and a processor, coupled to the memory and the transceiver, that uses a first numerology in a first numerology resource unit group (NRG) with a reference subcarrier spacing, switches from the first numerology to a second numerology, and uses the second numerology in a second NRG with a specific subcarrier spacing different from the reference subcarrier spacing. The first NRG is a set of frequency and time resources based on the first numerology, and the second NRG is a set of frequency and time resources based on the second numerology.

Advantageous Effects of Invention

URLLC can be supported efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows an example of subframe type for NR.
FIG. 5 shows an example of dynamic multiplexing of different numerologies.

FIG. 6 shows an example of semi-static partitioning between NRGs according to an embodiment of the present invention.

FIG. 7 shows an example of in-band multiplexing of NRGs according to an embodiment of the present invention.

FIG. 8 shows an example of cross-NRG scheduling according to an embodiment of the present invention.

FIG. 9 shows an example of system bandwidth for in-band multiplexing according to an embodiment of the present invention.

FIG. 10 shows an example of two-level DCI according to an embodiment of the present invention.

FIG. 11 shows an example of two-level DCI for semi-static partitioning and dynamic partitioning according to an embodiment of the present invention.

FIG. 12 shows an example of data transmission from NRG of a host RSC perspective and NRG of URLLC perspective according to an embodiment of the present invention.

FIG. 13 shows an example of dynamic indication for two-level DCI according to an embodiment of the present invention.

FIG. 14 shows another example of dynamic indication for two-level DCI according to an embodiment of the present invention.

FIG. 15 shows an example of unpaired spectrum usage case with one GP in a default NRG subframe according to an embodiment of the present invention.

FIG. 16 shows an example of unpaired spectrum usage case with multiple GPs in a default NRG subframe according to an embodiment of the present invention.

FIG. 17 shows another example of example of two-level DCI according to an embodiment of the present invention.

FIG. 18 shows another example of example of two-level DCI according to an embodiment of the present invention.

FIG. 19 shows an example of data transmission for URLLC according to an embodiment of the present invention.

FIG. 20 shows another example of data transmission for URLLC according to an embodiment of the present invention.

FIG. 21 shows another example of data transmission for URLLC according to an embodiment of the present invention.

FIG. 22 shows another example of actual scheduling for eMBB according to an embodiment of the present invention.

FIG. 23 shows another example of data transmission for URLLC according to an embodiment of the present invention.

FIG. 24 shows a method for using multiple numerologies by a UE according to an embodiment of the present invention.

FIG. 25 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-advanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

In next generation network, it is expected that various usage scenarios requiring different latency and reliability key performance indicators (KPIs) are supported in the same frequency region, potentially by the same cell. Furthermore, to allow growing vertical industry and potentials needs (yet unknown) in the future, frame structure should be able to support very flexible resource utilizations. There may be different applications requiring different latency, data rate and capacity requirements. Depending on applications, necessary mechanisms may be different from each other. In the present invention, mechanisms to support ultra-reliable low latency communication (URLLC) applications will be proposed.

For a convenience, a carrier with new RAT may be called as a NR carrier. The NR carrier may be operated with a base numerology where initial access related signals/channels (such as synchronization signals and physical broadcast channel (PBCH)) are transmitted. Hereinafter, unless otherwise stated, the base numerology will be used. Also, more than one NR carriers may be overlapped in frequency domain and semistatic frequency sharing may also be supported. The base numerology may be different per deployment scenario, and thus a UE may have to blindly search via initial access or synchronization procedure.

Further, for a convenience, in a time T, a frequency region based on a base numerology may be called as a numerology resource unit group (NRG). Alternatively, a set of frequency and time {F, T} may be called as a NRG. One example may be to define a NRG with normal CP in LTE as {system bandwidth, normal subframe+physical downlink control channel (PDCCH) region in multicast-broadcast single-frequency network (MBSFN) subframes}. Another example may be to define a NRG as {200 kHz, all available UL subframes} in NB-IoT of 3GPP LTE for UL portion, which is different from LTE host carrier. The present invention discusses techniques to support overlaid numerology usage, where mainly different numerologies are used for different usage scenarios or different transmission mechanisms. More particularly, the present invention focuses on supporting URLLC applications, where UEs supporting URLLC applications are supported simultaneously with other services, such as enhanced mobile broadband (eMBB). As URLLC requires low latency, in unpaired spectrum, this implies that frequent UL/DL switching needs to be supported. Unless the network supports full duplex capability in the same frequency/time resources, this implies that UL of URLLC may hinder other usage scenario's DL transmission, and the DL of URLLC may hinder other usage scenario's UL transmission. Thus, efficient mechanisms to handle multiplexing of different usage scenarios may be necessary.

FIG. 5 shows an example of dynamic multiplexing of different numerologies. FIG. 5 is shown from a network perspective. From a network perspective in a carrier, numerology may change by both time division multiplexing (TDM) and frequency division multiplexing (FDM). TDM may occur in OFDM symbol level or a mini-subframe level or a subframe level.

From a UE perspective, a UE may support only one numerology at a time or support more than one numerologies simultaneously depending on its capability. In terms of UE capability, the UE may indicate whether the UE can support only a subset of numerologies which can be used in a TDM manner, or the UE can support all numerologies with a TDM manner, or how many numerologies can be supported simultaneously. URLLC applications may utilize higher subcarrier spacing than the basic subcarrier spacing. A few example of utilizing different numerologies may be as follows.

(1) To transmit control/data in a short time, shorter OFDM symbol length may be used.

(2) To utilize UL transmission with potentially guard period in an OFDM symbol, higher subcarrier spacing may be used.

(3) To support multiple UEs in a TDM manner due to analog beam forming in a short time for URLLC UEs, it may be desirable to reduce finishing transmissions of control/data in a very short time with higher subcarrier spacing.

For a convenience, the present invention may assume a reference subcarrier spacing (RSC) which may be used in synchronization signal or higher layer (e.g. via PBCH indication) configured by the network to be used for group-specific or cell-specific control transmission such as control information to schedule system information.

However, subframe used in the network may be defined by the RSC, and timing may always be based on subframe of RSC regardless of different numerologies are multiplexed in a NRG. For example, different number of OFDM symbol may be placed within a subframe depending on numerologies (e.g. 14 OFDM symbols with 15 kHz subcarrier spacing in normal CP, 28 OFDM symbols with 30 kHz OFDM symbols in normal CP, 28 OFDM symbols with 60 kHz subcarrier spacing). A minimum time-unit may be an OFDM symbol based on RSC or 2 OFDM symbols based on RSC or 7 OFDM symbols based on RSC.

If semi-static FDM is used, RSC may be configured/defined per different frequency region. In other words, multiple RSC may be used in a NR carrier. For example, different numerologies may be used between single cell transmission and multimedia broadcast multicast services (MBMS) transmission, which may be multiplexed by FDM. In this case, synchronization signal may be commonly used, whereas control signal may be used with different numerology. A frequency region with RSC may be called as NRG based on RSC. However, if dynamic TDM is supported within a NRG, different numerology may be used within the NRG, and it may be represented that multiple NRGs are overlaid with each other partially or fully.

Defining a NRG with a RSC for DL is described according to an embodiment of the present invention. At least one of the followings may be considered.

(1) NRG with a RSC for DL may be defined with a RSC which is used for synchronization signal (such as primary synchronization signal (PSS)/secondary synchronization signal (SSS) or SSS/extended synchronization signal (ESS)). At least minimum bandwidth to support synchronization signal may be defined as NRG, and the bandwidth may be indicated later in PBCH and/or system information block (SIB).

(2) NRG with a RSC for DL may be defined with a RSC which is used for system information transmission (such as PBCH and/or SIB). The numerology used for SIB may be indicated in PBCH. The bandwidth may be indicated in PBCH and/or SIB.

(3) NRG with a RSC for DL may be defined with a RSC which is higher layer configured. In this case, the network may define the frequency region by higher layer signaling as well.

When a UE supports multiple NRGs, there may be a default NRG and additional NRG(s). The default NRG may be generally used for synchronization procedure/initial access. The additional NRG(s) may be used for usage-scenario specific and/or transmission scheme specific usage.

One approach to define numerology may be to configure transmission mode, and numerology used for the specific transmission mode may also be configured. Default value may be the same numerology used in default NRG. For example, short TTI operation may be defined as a transmission mode, and short TTI may be used either by TTI shortening operation with the same numerology to that of default NRG or TTI shortening operation with scaled numerology compared to default NRG or combination of both.

Defining a NRG with a RSC for UL is described according to an embodiment of the present invention. At least one of the followings may be considered.

(1) NRG with a RSC for UL may be defined by physical random access channel (PRACH) configuration, and PRACH configuration may be configured with numerology used. In other words, different PRACH resources with different numerology configurations may be considered. This may be used with DL default NRG. However, numerology used in DL and UL may be different with each other even for default NRG. In other words, UL default NRG may be defined separately from DL default NRG.

(2) NRG with a RSC for UL may be defined by higher layer, e.g. UE-specifically. Additional NRG(s) may also be defined for UL which may be used for usage-scenario specific and/or transmission scheme specific usage.

(3) NRG with a RSC for UL may be defined by following DL NRG definition, with potentially different bandwidth and location which may be reconfigured or configured by higher layer. Unless configured otherwise, default numerology used in UL may be assumed to be the same to that of DL default NRG.

If a UE supports smaller bandwidth than a NRG, the UE may signal the supported bandwidth to the network. To schedule a UE with smaller bandwidth than a NRG, two approaches may be considered as follows.

(1) Semi-static configuration of starting/end of a NRG in a UE-specific manner: In terms of resource allocation, a UE may be configured with starting/ending of a NRG based on the supported bandwidth.

(2) Dynamic configuration of starting/ending of a NRG in a UE-specific manner via scheduling and configurations: In terms of resource allocation, a UE may be configured with starting/ending of a NRG which is the same as the NRG bandwidth (i.e. cell-specific). The scheduling may indicate the location of frequency where a UE is scheduled with. To support frequency retuning latency, at least frequency location of control transmission needs to be semi-statically indicated.

For example, a network may configure 40 MHz bandwidth to construct a NRG in the carrier, with 15 kHz subcarrier spacing in normal CP for eMBB UEs. A UE supporting 10, 20, 40 MHz bandwidth respectively may be associated with the cell in different region. In this case, minimum system bandwidth may be defined as 5 MHz. The network may configure semi-static NRGs for such as eMBB/massive MTC (mMTC) UEs or eMBB/URLLC UEs. Frequency region of a NRG may change over time. For example, for frequency diversity, hopping may be used based on hopping pattern which may be derived from a common ID or configured by the network. The semi-statically configured NRGs may be overlapped where one mode of operation is inband.

FIG. 6 shows an example of semi-static partitioning between NRGs according to an embodiment of the present invention. Referring to FIG. 6, a NRG with 15 kHz subcarrier spacing and a NRG with 30 kHz subcarrier spacing are allocated based on the supported bandwidth. A starting/end of a NRG may be semi-statically configured by UE-specific manner.

FIG. 7 shows an example of in-band multiplexing of NRGs according to an embodiment of the present invention. Referring to FIG. 7, a first NRG with 15 kHz subcarrier spacing is configured in the entire system bandwidth. A second NRG with 30 kHz subcarrier spacing is configured in a smaller bandwidth, which may be placed within the first NRG.

For minimum system bandwidth, there may be two approaches as follows.

(1) Minimum bandwidth may be rather small (e.g. 25 RBs), and it may not be able to accommodate PSS/SSS/PBCH/beamforming reference signal (BRS) in one OFDM symbol. For example, if PBCH requires 24*12 REs, 25 RBs may not be sufficient. In this case, FDM manner among initial synchronization signals may not be easily feasible. As FDM may be efficient at least for higher frequency range where large portion of spectrum may be available, different minimum bandwidth may be defined per frequency spectrum. Depending on the minimum bandwidth, the transmission mechanism of initial signals may be different (e.g. FDM and/or TDM). The transmission mechanism of initial signals may be defined by the minimum system bandwidth of a given carrier in a frequency region regardless of the actual system bandwidth.

(2) Minimum bandwidth may be rather large (e.g. 100 RBs), and FDM among initial signals may be possible. If a network cannot support the minimum bandwidth due to FDM among different numerologies or due to available frequency, etc., it is possible that a carrier may operate smaller bandwidth than the minimum bandwidth. In such a case, FDM between signals may not be possible due to the smaller size of bandwidth, thus, in such a case, TDM (or, hybrid with FDM) among initial signals may be considered. When this approach is used, the minimum bandwidth that a UE supports may be smaller than the minimum system bandwidth. In such a case, it is expected that a UE may switch frequency to read other initial signals from PSS (and/or SSS). However, at least minimum bandwidth of UE and system bandwidth may be larger than the required bandwidth of PSS/SSS (FDM manner transmission). Thus, transmission of PBCH/radio resource management (RRM)-RS may be transmitted in TDM manner from PSS/SSS.

If FDM and/or TDM among initial signals is used, a UE may need to be able to search the signal transmission type either via assistance signalling or blindly. In case of assistance signalling, the serving cell or primary cell (PCell) may indicate the information. In case of blind search, PSS/SSS may carry the information of initial signal transmission mechanism. By detecting PSS/SSS, the UE may know how PBCH/RRM-RS are transmitted. If PSS/SSS carries the information, the information (0 or 1-FDM or TDM) may be indicated via SSS or relative location between PSS/SSS. For example, if PSS is placed lower than SSS in frequency region, it may be indicated that TDM is used. If PSS is placed higher than SSS, it may be indicated that FDM is used.

Another example is to configure one NRG over the system bandwidth and numerology may change dynamically in FDM/TDM manner in every minimum unit of the NRG. Hereinafter, the minimum unit of the NRG (e.g. OFDM symbol) may be called as numerology OFDM symbol (NOS) which is defined by the RSC. For example, if RSC of a carrier is 15 kHz, NOS may the OS with 15 kHz. Thus, if 30 kHz subcarrier spacing is used, at least two OS may be continuously used with 30 kHz subcarrier spacing, and 4 OS may be continuously used with 60 kHz subcarrier spacing.

Based on the above mechanisms to support different numerologies in the carrier, hereinafter, various embodiments of the present invention will be described from a UE perspective, particularly focusing on URLLC UEs, based on the assumption that numerology is used in different resources.

1. Semi-Static Partitioning Between eMBB/URLLC

This may correspond to FIG. 6 shown above. The following approaches may considered.

(1) Independent operation including synchronization: In this case, synchronization signals may be searched/deployed independently. If different frequency is treated independently even with independent synchronization signals, a UE may search different NRGs like two different cells/carriers. If a UE supports both eMBB/URLCC, it may support them like carrier aggregation (CA).

(2) Shared synchronization signal: synchronization signal may be shared based on eMBB NRG with RSC. The URLLC UE may be reconfigured to URLLC NRG region via cell search (e.g. PBCH blind decoding on different numerology). Whenever a UE has to perform synchronization and/or cell access, default NRG may be used for the operation. Alternatively, additional synchronization signals may be transmitted for the additional NRG as well. Alternatively, The URLLC UE may be reconfigured to URLLC NRG region via higher layer signalling (e.g. UE-specific signalling). This may be viewed as enhanced MTC (eMTC) narrowband. The eMTC narrowband may be defined as additional NRG, whereas the center 6 RB is the default NRG. Whenever a UE needs to switch to the default NRG, it may follow the default numerology, i.e. RSC.

In this case, cross-NRG scheduling may also be considered, which may be similar to LTE cross-carrier scheduling.

FIG. 8 shows an example of cross-NRG scheduling according to an embodiment of the present invention. Referring to FIG. 8, control signal in a first NRG in a first numerology schedules data in a second NRG in a second numerology. Similar to cross-carrier scheduling, starting location of OFDM symbol to receive data may be indicated/higher layer configured. For example, if control signal is transmitted at most 2 OFDM symbols with one numerology, it may correspond to 4 OFDM symbols with another numerology. Thus, unless a UE can support both numerologies at the same time, it may need to be clarified that the starting OFDM symbol of scheduled NRG should not be earlier than the maximum control transmission from the scheduling NRG. Thus, starting OFDM symbol may be configured depending on UE capability or implicitly determined by the OFDM symbol length of scheduling NRG's control region. Alternatively, cross-NRG scheduling may be applied only with cross-NRG and cross-subframe scheduling. Also, the end of scheduled data needs to be clarified as well. As shown in FIG. 8, the subframe length of scheduled NRG may be smaller than that of scheduling NRG. Alternatively, cross-NRG may be done based on either numerology (scheduled NRG or scheduling NRG) for the simplicity. Alternatively, cross-NRG scheduling may not be supported.

Alternatively, numerology and/or starting/ending of data transmission (or the corresponding short TTI index) may be configured dynamically via scheduling information. The location of control region may be configured in terms of the first OFDM symbol in every subframe. The similar issue may also apply to the case that cross-scheduling occurs between a frequency region with a TTI length and another frequency region with another TTI length. Thus, techniques for short TTI with keeping the same numerology may also be applied to the case with short TTI by scaling numerology without loss of generality. If this is applied, if short TTI with the same numerology is used, data may be scheduled over "K" OFDM symbols for default numerology, whereas data may be scheduled over "K*m" OFDM symbols for scaled numerology, where SC=m*RSC.

2. In-Band Multiplexing

FIG. 9 shows an example of system bandwidth for in-band multiplexing according to an embodiment of the present invention. Referring to FIG. 9, maximum system bandwidth for eMBB UEs and URLLC UEs are configured. In other words, different system bandwidth may be considered for eMBB/URLLC UEs. For this, initial access or the maximum system bandwidth for eMBB carrier may be indicated as the maximum system bandwidth (which can cover URLLC as well) and eMBB UEs may be operated in a subband only where the subband size is determined by the maximum system bandwidth supported by an eMBB UE based on a given numerology. Thus, in terms of signaling necessary for multiplexing of eMBB/URLCC UEs, multiple duplicated signaling may be given to each subband. Each subband may be defined by the minimum system bandwidth that an eMBB UE may support.

If different numerologies are multiplexed in in-band manner, multiple different approaches of control/data transmission in both DL and UL may be considered as follows. For a convenience, a NRG may be called as a host/default NRG which uses RSC which is used in sync signals and/or system information transmission.

(1) Approach 1: All control/data (including group-specific) may be transmitted differently between different NRGs or among different usage scenarios. For example, when a UE is configured with different numerology from RSC, it may be expected that all transmission is based on the configured numerology. Only exception to this case may be to read system information. Starting from random access procedure, the configured numerology may be used. To support this, random access configuration may indicate different resources with different numerologies or different usage scenarios.

(2) Approach 2: Group-specific control/data may be transmitted based on RSC of host NRG, whereas UE-specific control/data may be transmitted based on different numerology (which can be configured UE-specifically).

(3) Approach 3: Dynamic numerology switching may be used. For example, numerology used for data scheduling may be indicated via control message.

For a convenience, the following procedure is procedure in which a UE accesses the network and performs control/data transmission/reception.

(1) Transmission ID (TID) search: Search TID via synchronization signals (2) Receive PBCH (via another carrier or from the carrier)

(3) Receive PRACH configuration (via another carrier or from the carrier). PRACH configuration may be called as SIB-PRACH (4) Transmit PRACH (5) Receive PRACH-response message (6) Transmit contention-resolution message (7) Receive contention-resolution response message (8) Receive UE-specific configuration message (9) Receive DL control/data

(10) Transmit acknowledgement/non-acknowledgement (ACK/NACK)

(11) Receive UL grant

(12) Transmit physical uplink shared channel (PUSCH)

If contention-based UL transmission is considered, a UE may transmit data along with PRACH or after PRACH transmission. In such a case, steps (5)-(10) may be omitted.

Based on the procedure described above, the details of approaches described above may be as follows.

(1) Approach 1: This implies that different numerology from RSC of the host NRG may be used from steps (4) or (6) or (9) or (11).

A. To support different numerology from RSC of the host NRG from step (4), PRACH configuration may need to be configured differently per each usage scenarios or based on certain criteria, such as UE measurement on certain things, or requirements of latency, or UE capability, etc.

B. To support different numerology from RSC of the host NRG from step (6), PRACH configuration may be same, but based on UE capability or latency requirement transmitted via PRACH, configuration of numerology may be given in step (5).

C. To support different numerology from RSC of the host NRG from step (9), numerology configuration may be given in step (8).

D. To support different numerology from RSC of the host NRG from step (11) with contention-based transmission, configuration may be given in PRACH resource set or by UE-specific higher layer signalling.

(2) Approach 2: For this approach, similar to Approach (1)-C, UE-specific numerology may be given via UE-specific signalling. However, a UE may also monitor RSC of the host NRG for group-specific control/data remissions. To minimize UE complexity, it may be necessary to configure resource blocks in frequency/time domain where group-specific control/data transmission would be used. This may be done in different ways.

A. Group-specific control regions may be configured. In the group-specific control regions, a UE may be supposed to read group-specific control messages in the RSC of the host NRG. This approach is to configure periodicity, frequency resource of group-specific control message transmissions.

B. Regions where different numerologies may be applied may be configured, where a UE may assume that in other regions the RSC of the host NRG is used. This approach may be similar to MBMS in LTE, where control message of MBMS is read based on normal CP in normal subframe and/or 2 OFDM symbols in MBSFN subframes. The regions may be configured in both time/frequency resources.

(3) Approach 3: The above mechanisms may not work effectively in case that a UE supports both eMBB and URLCC, for example. Thus, some dynamic switching of different numerologies may be considered, which is similar concept to LTE latency reduction/TTI shortening. TTI shortening may be achieved either via reducing the number of OFDM symbols or via increasing subcarrier spacings with a given number of OFDM symbols (e.g. 4 OFDM symbols). The following two options may be considered.

A. Two-level DCI: Two levels of control information scheduling, one with the RSC of the host NR, and the other with different numerology specific to usage scenario or UE.

B. One-level DCI: Control my always be scheduled with the RSC of the host NRG, whereas data may be dynamically scheduled with different numerology.

Hereinafter, two level DCI (or one level DCI+second level confirmation signalling) according to an embodiment of the present invention is described in detail. Different DCI in terms of interval where control is monitored and/or numerology may be considered to support different usage scenarios or per UE. In order to support two level DCI, the following options may be considered.

(1) The numerology may be kept, and only interval may be changed: Similar to TTI shortening in LTE, numerology may be kept and TTI may be changed or reduced by reducing the number of OFDM symbols where control is scheduled. In this case, different usage scenarios or different requirements may be met by different intervals of control channel monitoring (2) With option (1), numerology may also be changed. A UE may monitor two levels of DCI in two different timings, and different numerologies may also be used in different timings.

The DCI based on interval of subframe in the host NRG may also schedule necessary information of second level DCI and/or data. In other words, first level DCI based on subframe of the RSC of the host NRG may indicate partially or fully resource allocation information of second-level DCI and/or data scheduled by second-level DCI.

If numerology is changed, as a UE may expect two different numerologies at the same time, the first level DCI may need to indicate resources used with different numerology, or a UE may assume that it will not be configured with different numerology once it is scheduled with one numerology control/data transmission.

FIG. 10 shows an example of two-level DCI according to an embodiment of the present invention. Referring to FIG. 10, the first level DCI with RSC may schedule necessary information of second level DCI and/or data, e.g. indication of resource and/or numerology. The second level DCI may schedule data with second numerology.

FIG. 11 shows an example of two-level DCI for semi-static partitioning and dynamic partitioning according to an embodiment of the present invention. For example, if one subframe with 15 kHz subcarrier spacing consists of 14 OFDM symbols (OSs), it may be divided into 7*2 OS TTIs and one TTI may include one-level of DCI. FIG. 11-(a) shows two-level DCI for semi-static partitioning. In FIG. 11-(a), different numerology is used in different subframe and other numerology may be used as long as default numerology is not used in the subframe. FIG. 11-(b) shows two-level DCI for dynamic partitioning. In FIG. 11-(b), to support dynamic change, the first level DCI with host RSC may indicate the configuration of different numerology in terms of time/frequency. The followings is more general example with 15 kHz subcarrier spacing.

14 OSs with normal CP constructs a subframe.

A short TTI with 2 NOS may be called as a mini-subframe.

A UE supporting URLLC may be configured with monitoring control channel in every mini-subframe. For a UE supporting only URLLC, different numerology on control may be configured. For a UE supporting both eMBB/URLLC, numerology of control channel may follows 15 kHz subcarrier spacing.

A UE may read both control (per short TTI/mini-subframe) and data (per subframe), which may be overlaid in frequency/time. Once short-TTI based control schedules data with different numerology, a UE may assume that data over subframe is punctured in such OFDM symbols. In OFDM symbol scheduled with control in mini-subframe level, it may also be assumed that data is punctured on control transmission.

FIG. 12 shows an example of data transmission from NRG of a host RSC perspective and NRG of URLLC perspective according to an embodiment of the present invention. To minimize UE complexity, control of URLLC may be transmitted via 15 kHz subcarrier spacing, whereas data may be transmitted with 30 kHz subcarrier spacing in different OS (unless control region with different numerology is known in advance). However, a UE may not have acquired subcarrier spacing information a prior due to control channel decoding latency. Thus, if control channel indicates the change of numerology dynamically, the changed numerology may be in effect in the next subframe or interval. Or, between the control channel indicating the change of numerology and actual control/data transmission with different numerology from host NRG, to absorb the control channel decoding latency, the gap OFDM symbol(s) may be placed. Specifically, DL scheduling message may be indicated with scaled numerology where data will be scheduled in the same time resources, whereas UL grant message may be indicated with the numerology of the default NRG. The first level DCI with default numerology may indicate the time/frequency resource in which UL grant message and DL scheduling message may be scheduled.

More specifically, first level DCI may indicate how to realize short TTI within a subframe of default NRG, either via reducing OFDM symbols with keeping the same numerology or changing the numerology or both. There may be dynamic indication which may change the configuration of TTI length and/or numerology. The dynamic indication may be periodically transmitted or occasionally transmitted. The dynamic indication may be UE-specific or group-specific or cell-specific. For example, in every 1 ms, dynamic DCI may indicate how to realize short TTI (e.g. by reducing TTI length to 2 NOS or by scaling numerology or both).

In terms of constructing short TTI with possibly different numerology, the following two approaches may be considered.

FIG. 13 shows an example of dynamic indication for two-level DCI according to an embodiment of the present invention. Referring to FIG. 13, short TTI including 2 NOS may be configured by excluding the first level DCI region. That is, one or a few NOS may be fixed to transmit first level DCI which is not accounted for short TTI. For example, one NOS in the beginning of each slot or in the beginning/ending of the subframe may be reserved for default numerology transmission and remaining NOSs may be divided into short TTIs.

FIG. 14 shows another example of dynamic indication for two-level DCI according to an embodiment of the present invention. Referring to FIG. 14, short TTI including 2 NOS may be configured by including the first level DCI region. That is, one or a few NOS may be included for first level DCI transmission in one or more short TTIs. The region with first level DCI may be used with default numerology or RSC of the default NRG. Data scheduled by first level DCI or the RSC of the default NRG may also be scheduled with RSC of the default NRG unless it is indicated via DCI otherwise.

This may be applied to paired spectrum in which UL and DL spectrum are separated from each other. In case of unpaired spectrum, similar mechanism may be used with possible GP in a subframe of default NRG.

FIG. 15 shows an example of unpaired spectrum usage case with one GP in a default NRG subframe according to an embodiment of the present invention. Referring to FIG. 15, GP and sounding reference signal (SRS) may be placed in one OFDM symbol to reduce the overall duration to reserve for GP and SRS transmission. After GP, uplink control transmission may be placed to minimize the transient period impact on control information transmission. UL data portion may be used for UL data and/or control.

FIG. 16 shows an example of unpaired spectrum usage case with multiple GPs in a default NRG subframe according to an embodiment of the present invention. Referring to FIG. 16, multiple GPs and SRSs may be placed in one OFDM symbol to reduce the overall duration to reserve for GP and SRS transmission. After GP, uplink control transmission may be placed to minimize the transient period impact on control information transmission. UL data portion may be used for UL data and/or control.

Bandwidth of different numerology or scaled numerology may be increased, and the number of resource elements schedulable to a UE in a given time may be increased. It may be supported given the condition/assumption that it may not increase the maximum TBS that a UE has to handle within a short TTI. In other words, when multiple short TTI lengths can be supported in the network, for a short TTI length with K OFDM symbols with a default NRG numerology (e.g. 15 kHz subcarrier spacing in normal CP), a UE may be scheduled with maximum N RBs with the default numerology (RSC) with maximum TBS of maxTBS. Or, a UE may be scheduled with maximum N RBs with any scaled numerology with maximum TBS of maxTBS. Or, a UE may be scheduled with a data spanning K OFDM symbols with the default numerology. Or, a UE may be scheduled with a data spanning K*m OFDM symbols with the scaled numerology where SCi=RSC*m. Thus, a UE may be configured with larger number of resource elements with scaled numerology which allows faster scheduling, and thus may reduce the latency.

As mentioned above, the effective change may occur in the next subframe/TTI to allow control channel decoding latency. Or, there may be a gap between first level DCI and second level DCI. If the first level DCI and second level DCI use different numerology, it may be assumed that numerology for each control channel is known in advance if either approach to consider control channel decoding latency is considered. If DCI dynamically changes the numerology of data, the similar handling may be necessary. Thus, the present invention may assume that a URLLC UE already knows the numerology used for data transmission, and the first level DCI may indicate the actual scheduling information. If the first level DCI indicates no URLLC scheduling in a subframe, it may skip data decoding with URLLC numerology for battery saving. To handle the control channel decoding latency of first level DCI which may dynamically change the numerology of second level DCI and data, the gap may be configured between the first level DCI and the second level DCI, which will be affected by the configuration of the first level DCI (e.g. one short TTI length).

FIG. 17 shows another example of example of two-level DCI according to an embodiment of the present invention. FIG. 17-(a) shows an example actual application of numerology change is applied after a gap (e.g. one short TTI). FIG. 17-(b) shows an example that a gap is placed for control decoding latency.

FIG. 18 shows another example of example of two-level DCI according to an embodiment of the present invention. When a gap is placed, it may be further simplified that one subframe is divided into 'm' (e.g. m=7) mini-subframes, and the short TTI with first level DCI may also be one short TTI. Referring to FIG. 18, in the gap, data may be placed. In this case, to handle gap for UL portion, a short TTI with short UL data portion may be considered.

In summary, the present invention proposes the followings

A short TTI length may be defined by a default NRG, and its OFDM symbol length

Multiple set of a short TTI with different numerologies which shares the same short TTI length may be supported.

To support dynamic switching between different numerologies depending on UE capability/requirement and/or network conditions, two-level DCI with first level DCI indicating numerology information for second level DCI and/or data may be considered.

For control channel decoding latency, the delay between first level DCI and second level DCI may be considered, and the gap may be used for other transmission (effective delay between two is larger than zero).

Overall, the network may support multiple set of short TTIs as follows, assuming subframe length of SC0 (reference subcarrier spacing) is 14 OSs (or 7 OSs). Different sets may also be supported.

Set 1: (SC0, 2 OS), (SC0*2, 4 OS), (SC0*4, 8 OS), (SC0*8, 16 OS), (SC0*16, 32 OS), (Optionally (SC0*5, 10 OS))

Set 2: (SC0, 7 OS), (optionally (SC0*2, 14 OS), (SC0*4, 28 OS), (SC0*8, 56 OS), (SC0*16, 112 OS), (Optionally (SC0*5, 35 OS)))

Set 3: (SC0, 14 OS), (optionally (SC0*2, 28 OS), (SC0*4, 56 OS), (SC0*8, 112 OS), (SC0*16, 224 OS), (Optionally (SC0*5, 70 OS)))

Set 4 (Optionally): (SC0, 4 OS), (SC0*2, 8 OS), (SC0*4, 16 OS), (SC0*8, 32 OS), (SC0*16, 64 OS), (Optionally (SC0*5, 20 OS))

Longer TTI may be constructed as multiple of subframe of SC0 (in opposite direction), and necessary puncture resources may be defined to accommodate different numerologies and/or different UL/DL direction. This may be rather called subframe grouping for numerology changes. Subframe grouping may also be used for DL/UL direction switching or change of subframe type.

If different numerology based carrier is aggregated, it is good to align at least subframe based on the larger subframe duration. For example, RSC in one carrier may be 15 kHz, and RSC in other carrier may be 60 kHz. In this case, subframe of 14 OSs or 7 OSs of 15 kHz subcarrier spacing may be used as a reference, and multiple subframes of 60 kHz subcarrier spacing may be placed within the subframe of 15 kHz subcarrier spacing. Alternatively, it may follow the PCell or master cell, or configured by the network to use the reference subframe length. If multiple subframes belong to one reference subframe, scheduling may occur multiple times as if it is short TTIs from the reference subframe/TTI perspective. Alternatively, the shortest TTI may be used for the scheduling, and the shortest TTI may be aligned with multiple OFDM symbols of different subcarrier spacing (desirably). As 7 OSs of shortest TTI may not be scalable to other numerology, slot length may be defined as follows, where a subframe consists of 7 slots.

2 OSs in 15 kHz subcarrier spacing (7 slots in 1 ms with normal CP, 6 slots in 1 m with extended CP)

4 OSs in 30 kHz subcarrier spacing (7 slots in 1 ms with normal CP, 6 slots in 1 m with extended CP)

8 OSs in 60 kHz subcarrier spacing (7 slots in 1 ms with normal CP, 6 slots in 1 m with extended CP)

16 OS in 120 kHz subcarrier spacing (7 slots in 1 ms with normal CP, 6 slots in 1 m with extended CP)

The slot size may be different, e.g. 7 OSs or 4 OSs. With 4 OSs, there may be 7 slots over 2 ms with normal CP.

Based on the slot, basic scheduling unit may be defined as multiple of slots. One example may be as follows.

1 reserved slot in 1 ms, data may span 3 (or 6)*slots in 15 kHz subcarrier spacing in normal CP, data may span 3 (or 6)*slots in 15 kHz subcarrier spacing in extended CP.

1 reserved slot in 1 ms, data may span 2 (or 4)*slots 30 kHz in subcarrier spacing in normal CP, data may span 2 (or 4)*slots in 30 kHz subcarrier spacing in extended CP.

Data may span 1 (or 2 slots) in 60 kHz subcarrier spacing.

For lower subcarrier spacing, the followings may be defined as subframe group.

56 OSs in 15 kHz subcarrier spacing within 4 ms

28 OSs in 7.5 kHz subcarrier spacing within 4 ms

14 OSs in 3.75 kHz subcarrier spacing within 4 m

Hereinafter, dynamic indication of inband multiplexed different numerology and/or URLLC is described. So far, it has been discussed how to multiplex URLLC (or different numerology) to host NRG (e.g. eMBB carrier). If URLLC traffic requires very low latency and high reliability, it is likely that some scheduling mechanisms for URLLC transmission may be considered, which generally tends to lead higher power transmission in both DL and UL transmission. In terms of URLLC data DL transmission, the following approaches may be considered.

(1) Power boosting may be applied on smaller number of RBs, and other RBs may be empty to borrow the power from. In this case, if URLLC transmission occurs with e.g. system bandwidth wide RS transmission such as BRS, BRS may not be transmitted. Thus, if this operation is supported, even BRS is configured for entire system bandwidth or large system bandwidth, a UE may assume that there may be cases where BRS transmission is rather omitted or transmitted over limited frequency bandwidth.

(2) Another approach of power boosting may be to empty/null a few REs in each resource block. For example, instead of utilizing all subcarriers in a RB, only a few REs may be used with power. This may also be applied to demodulation reference signal (DM-RS) transmission to enhance the overall power density.

Similar mechanism may be applied to UL transmission as well where a UE is scheduled with different transmission mechanism for URLLC and/or different power level used for URLLC data transmission. To determine power, a separate power control for URLLC and eMBB (or per different numerology) may be assumed or power boosting level may be dynamically indicated at URLLC data grant.

Also to enhance the frequency diversity, the data may be rather distributed over the entire system bandwidth. One mechanism of transmission may be to utilize positioning reference signal (PRS) like pattern for data transmission. In other words, a few REs in each OS, each RE may be different per different OS (and thus spread out), may be used, and the transmission may occur over the entire system bandwidth or entire carrier's bandwidth of default NRG region.

When URLLC data is prioritized over other eMBB data and thus puncture on-going transmission, it may impact the overall performance of eMBB data (or the long TTI transmission). To reduce the impact on the UE reception performance (where only garbage data may be delivered at OFDM symbol (and frequency region) used for URLLC transmission), it may be necessary to have a mechanism to dynamically indicate the presence of URLLC data transmission or use of different numerology used in each OS. For this, instead of first level DCI, physical control format indicator channel (PCFICH) like common signal may be considered which may indicate whether to intend transmitting any URLLC or different numerology data or not in a given subframe. Further, the signal may be present in each OS or in every a few OS to indicate the numerology or the presence of URLLC data or the presence of puncturing data used in each OS or in a few OS.

When signalling is available or a UE can know the presence of different numerology or URLLC data with higher power in a given OS or a given time duration, cancellation of URLLC traffic may be performed. This may be applicable to inter-cell case where neighbouring cell interferes the data transmission with URLLC traffic or for a case where the serving cell transmits both URLLC and eMBB data at the same time with different power level.

Alternatively, single level DCI and confirmation signalling may be used. For example, single level DCI may schedule a multi-TTI scheduling for DL and UL, and in each TTI, confirmation signalling whether the actual scheduling has occurred or not may be signalled via UE-specific signalling (such as PCFICH type signalling). Considering that different numerology based URLLC traffic may puncture the on-going multi-TTI transmissions, indication may be given by previous short TTI. For example, one signalling may be indication of data puncturing which can be given at short TTI n−1 for short TTI n. If a UE detects the signal, it may assume that DL UL data has been punctured. For DL, a UE may assume that data is punctured over the short TTI n, and for UL, a UE may drop UL transmission over short TTI n.

In case of unpaired spectrum or a UE is half-duplex capable, the signalling may not be easily acquired while a UE is performing UL transmission. For this, some reserved DL symbols may be used even in UL subframe. Or, a UE may not be expected to monitor DL while it is performing UL transmission, and thus, signalling may not be detected. If a UE is associated with multiple carriers, signalling may be given to different carrier via cross-carrier signalling. The signalling of short TTI n−1 may be placed at the last OFDM symbol of short TTI n−1 to minimize the necessary latency to indicate the signalling. Signalling may be used for some other purposes, such as indication of different DL/UL direction or resource usage (either for access or backhaul or access or sidelink, etc.

3. Data Transmission for URLLC

As URLCC data (both DL and UL) transmission may occur as small as 1 OS, it may be necessary to determine scrambling index for data (and/or control transmission). One simple approach may be to use base numerology based OFDM symbol index for data scrambling of URLLC. If URLLC traffic is transmitted over multiple OSs, the first OS index may be used.

If URLLC utilizes numerology of SC0*4 (SC0 is the host numerology or base numerology), there may be potentially four URLLC numerology OSs possible within one OS of base numerology. In such a case, a mini subframe of 2 OS downlink pilot time slot (DwPTS)+1 OS GP+1 OS uplink pilot time slot (UpPTS) may be considered within one OS of base numerology. One approach of supporting low latency application for both DL and UL direction may be to support different numerology in different subband. For the middle subband, depending on the scheduling information of eMBB subband and URLLC subband, it may be used for D: or UL or gap. For example, if eMBB schedules DL and URLLC schedules UL, the middle subband may be used as a gap.

FIG. 19 shows an example of data transmission for URLLC according to an embodiment of the present invention. FIG. 20 shows another example of data transmission for URLLC according to an embodiment of the present invention. In FIG. 19, it is assumed that the eNB does not support self-interference cancellation and eMBB uses DL subframe type. In FIG. 20, it is assumed that the eNB does not support self-interference cancellation and eMBB uses UL subframe type. Referring to FIG. 19 and FIG. 20, the gap nay be used in flexible portion to support UL and DL simultaneously between eMBB and URLLC subbands. If URLLC subband configures less UL, less gap portion in flexible portion subband may be used. The gap OS for flexible portion may be dynamically and/or semi-statically configured to UEs scheduled in flexible portion.

The network may still flexibly choose the bandwidth of data scheduling with a given numerology while keeping semi-statically configured resources with a numerology. For example, if the network configures the semi-static resources with different numerology, in other frequency/time resource, the network may flexibly choose numerology based on scheduling.

FIG. 21 shows another example of data transmission for URLLC according to an embodiment of the present invention. In FIG. 21, it is assumed that the eNB does not support self-interference cancellation and eMBB uses DL subframe type. Referring to FIG. 21, some static resource may be configured for each numerology and low latency service and protection of control channels, such as PDCCH and physical uplink control channel (PUCCH). The flexible subband in the middle may be used for the gap in case DL and UL of bottom and up subbands are colliding.

Such resource configured as semi-static UL resource in a subframe or over a few OFDM symbols may also be used for backhaul signaling. To support various combinations among TX/RS points (TRPs), considering different semi-static UL resource (in terms of frequency/time resources) may be considered.

FIG. 22 shows another example of actual scheduling for eMBB according to an embodiment of the present invention. To support this, a semi-statically configured resource for UL (and/or DL) for URLLC or different numerology may be indicated to eMBB UEs (and also vice versa). It may be configured via SIB or UE-specific signaling or group signaling. In the configured semi-static resource, if different DL or UL direction is used, necessary gap may be used as punctured. The gap size may also be configured. Thus, from eMBB downlink scheduling perspective, at 2nd OFDM symbol, data may be scheduled only via the bottom subband (rate matched around the gap and URLLC subband portion), and 3rd OFDM symbol may carry data over the entire system bandwidth (according to scheduling), and so on. For this, subband information, used OS for different numerology, DL or UL, time location (in general time/frequency location) may be indicated to UEs utilizing different numerology. In addition to this, URLLC may puncture data depending on the traffic occurrence. To minimize the impact on eMBB traffic, unused portion by eMBB may be used for URLLC (maximize the resource of unused resource) before puncturing on-going eMBB traffic.

The semi-static resource may be used for scheduling request (SR) transmission, contention based UL transmission, backhaul signaling, RACH procedure, SRS transmission, uplink control information (UCI) transmission, etc. Other dynamic resource for URLLC may be dynamically configured by the scheduling.

More generally, this may be understood that there are reserved UL resources and DL resources in a subframe which cannot be used for DL or UL transmission. In addition to those resources, necessary gap to handle simultaneous DL/UL may be further used. In such unavailable resources or REs, data may be rate matched.

FIG. 23 shows another example of data transmission for URLLC according to an embodiment of the present invention. Referring to FIG. 23, potential gap in case that different direction is used may be configured to handle simultaneous DL/UL. Potential gap may be used only if different direction of scheduling is used. Otherwise, only gap for different numerology may or may not be applied. In such a resource, a TRP may configure different resource to different UEs. This configuration may be for eMB or UEs utilizing default subcarrier spacing. More specifically, different configuration may be separately configured per a numerology and a UE may apply the corresponding configuration depending on the numerology scheduled/used. The reserved UL/DL may also not be configured/used for sidelink operation (where sidelink transmission will also be rate matched). Also, any RS transmission and/or synchronization signal may not be transmitted in such reserved portion (including potential gap). The configuration may be given per subframe rather than an OS. Multiple levels of configuration may be given. Overall, configuration at subframe level, and within a subframe level may be considered, which may also be separately configured. For example, for URLLC, configuration may be given per OS within a subframe. For protecting or alignment with legacy DL/UL configuration, a subband (frequency region) and DL/UL type per subframe may be sufficient.

For SR transmission, among those semi-statically configured UL resource (which may not be guaranteed as UL all the time depending on other urgent data transmission), SR may be transmitted with contention-based approach and sequence or orthogonal cover code (OCC) index used for SR transmission may be selected randomly instead of allocating semi-static SR configuration to each UE. In SR transmission, it is thus necessary to transmit UE ID via payload or scrambling or other means. The fixed DL may also be used for synchronization and RRM-RS transmission.

FIG. 24 shows a method for using multiple numerologies by a UE according to an embodiment of the present invention. The present invention described above may be applied to this embodiment.

In step S100, the UE uses a first numerology in a first NRG with a reference subcarrier spacing. In step S110, the UE switches from the first numerology to a second numerology. In step S120, the UE uses the second numerology in a second NRG with a specific subcarrier spacing different from the reference subcarrier spacing. The first NRG is a set of frequency and time resources based on the first numerology, and the second NRG is a set of frequency and time resources based on the second numerology. The reference subcarrier spacing may be a 15 kHz, and the specific subcarrier spacing may be power of 2 for the reference subcarrier spacing. The first numerology may be used for transmission of synchronization signal and system information, and the second numerology may be used for a specific usage. The specific usage may be URLLC.

The switching from the first numerology to the second numerology may includes receiving a first level downlink control information (DCI) for scheduling in the first NRG, and receiving a second level DCI for scheduling in the second NRG. The first level DCI may further include scheduling information of the second level DCI. The first level DCI may be based on a first interval in the first NRG, and the second level DCI may be based on a second interval in the second NRG. The first level DCI may include information on resources where an UL grant or a DL scheduling message is scheduled. The first level DCI may include information on a short TTI within a subframe in the first NRG. The information on the short TTI may indicate that the first level DCI is not accounted for the short TTI. Or, the information on the short TTI may indicate that the first level DCI is included for the short TTI.

At least one of a reserved UL resource or a reserved DL resource may be configured in a subframe. The reserved UL resource cannot be used for DL transmission, and the reserved DL resource cannot be used for UL transmission. Further, a gap for simultaneous DL/UL transmission may be configured in the subframe.

FIG. 25 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method for using multiple numerologies by a user equipment (UE) in a wireless communication system, the method comprising:
 using a first numerology in a first numerology resource unit group (NRG) with a reference subcarrier spacing;

switching from the first numerology to a second numerology; and using the second numerology in a second NRG with a specific subcarrier spacing different from the reference subcarrier spacing, wherein the first NRG is a set of frequency and time resources based on the first numerology, wherein the second NRG is a set of frequency and time resources based on the second numerology, and wherein switching from the first numerology to the second numerology comprises:

receiving a first level downlink control information (DCI) for scheduling in the first NRG; and receiving a second level DCI for scheduling in the second NRG, wherein the first level DCI further includes scheduling information of the second level DCI.

2. The method of claim 1, wherein the first level DCI is based on a first interval in the first NRG, and wherein the second level DCI is based on a second interval in the second NRG.

3. The method of claim 1, wherein the first level DCI includes information regarding resources where an uplink (UL) grant or a downlink (DL) scheduling message is scheduled.

4. The method of claim 1, wherein the first level DCI includes information regarding a short transmission time interval (TTI) within a subframe in the first NRG.

5. The method of claim 4, wherein the information regarding the short TTI indicates that the first level DCI is not accounted for the short TTI.

6. The method of claim 4, wherein the information regarding the short TTI indicates that the first level DCI is included for the short TTI.

7. The method of claim 1, wherein at least one of a reserved UL resource or a reserved DL resource is configured in a subframe.

8. The method of claim 7, wherein the reserved UL resource cannot be used for DL transmission, and wherein the reserved DL resource cannot be used for UL transmission.

9. The method of claim 7, wherein a gap for simultaneous DL/UL transmission is configured in the subframe.

10. The method of claim 1, wherein the reference subcarrier spacing is a 15 kHz, and wherein the specific subcarrier spacing is power of 2 for the reference subcarrier spacing.

11. The method of claim 1, wherein the first numerology is used for transmission of synchronization signal and system information, and wherein the second numerology is used for a specific usage.

12. The method of claim 11, wherein the specific usage is an ultra-reliable low-latency communication (URLLC).

13. A user equipment (UE) configured to operate in a wireless communication system, the UE comprising:

a memory;

a transceiver; and a processor, coupled to the memory and the transceiver, that is configured to:

use a first numerology in a first numerology resource unit group (NRG) with a reference subcarrier spacing, switch from the first numerology to a second numerology, and use the second numerology in a second NRG with a specific subcarrier spacing different from the reference subcarrier spacing, wherein the first NRG is a set of frequency and time resources based on the first numerology, wherein the second NRG is a set of frequency and time resources based on the second numerology, wherein switching from the first numerology to the second numerology comprises:

receiving a first level downlink control information (DCI) for scheduling in the first NRG; and receiving a second level DCI for scheduling in the second NRG, wherein the first level DCI further includes scheduling information of the second level DCI.

14. The UE of claim 13, wherein the first level DCI is based on a first interval in the first NRG, and wherein the second level DCI is based on a second interval in the second NRG.

15. The UE of claim 13, wherein the first level DCI includes information regarding resources where an uplink (UL) grant or a downlink (DL) scheduling message is scheduled.

16. The UE of claim 13, wherein the first level DCI includes information regarding a short transmission time interval (TTI) within a subframe in the first NRG.

17. The UE of claim 16, wherein the information regarding the short TTI indicates that the first level DCI is not accounted for the short TTI.

18. The UE of claim 16, wherein the information regarding the short TTI indicates that the first level DCI is included for the short TTI.

* * * * *